(12) United States Patent
Salonen

(10) Patent No.: US 10,469,591 B2
(45) Date of Patent: *Nov. 5, 2019

(54) METHOD AND SYSTEM FOR MEDIATING AND PROVISIONING SERVICES

(71) Applicant: BOOKIT OY AJANVARAUSPALVELU, Helsinki (FI)

(72) Inventor: Jukka Kalevi Salonen, Luhtajoki (FI)

(73) Assignee: Bookit Oy (FI)

( * ) Notice: Subject to any disclaimer, the term of this patent is extended or adjusted under 35 U.S.C. 154(b) by 629 days.

This patent is subject to a terminal disclaimer.

(21) Appl. No.: 15/045,894

(22) Filed: Feb. 17, 2016

(65) Prior Publication Data

US 2016/0164977 A1 Jun. 9, 2016

Related U.S. Application Data

(63) Continuation of application No. 13/616,525, filed on Sep. 14, 2012, now Pat. No. 9,288,315, which is a
(Continued)

(30) Foreign Application Priority Data

Aug. 21, 2001 (FI) ........................... 20011680
Dec. 2, 2005 (FI) ........................... 20051245
(Continued)

(51) Int. Cl.
*H04L 29/08* (2006.01)
*H04W 4/14* (2009.01)
(Continued)

(52) U.S. Cl.
CPC ............ *H04L 67/14* (2013.01); *G06Q 10/02* (2013.01); *G06Q 10/109* (2013.01); *H04L 51/22* (2013.01);
(Continued)

(58) Field of Classification Search
CPC ...... G06Q 30/06; G06Q 10/02; G06Q 10/109; H04M 3/42382; H04L 67/14; H04L 51/28;
(Continued)

(56) References Cited

U.S. PATENT DOCUMENTS 5,592,666 A 1/1997 Perez
5,838,965 A 11/1998 Kavanagh et al.
(Continued)

FOREIGN PATENT DOCUMENTS

CN 1675637 A 9/2005
EP 0881802 A1 2/1998
(Continued)

OTHER PUBLICATIONS

Bmd wireless AG; Wirelss Application Messaging Serivce; Unknown 2004.
(Continued)

*Primary Examiner* — Kevin T Bates
*Assistant Examiner* — Chen-Liang Huang
(74) *Attorney, Agent, or Firm* — Barnes & Thornburg LLP

(57) ABSTRACT

Equipments and methods for a mediator server controlling communication between clients and service provider(s). Clients are associated with a client identifier address. The mediator uses multiple addresses for receiving communications from the clients regarding the provider(s). The mediator sends to the clients a set of inquiry messages pertaining to the service provider, in a first communication format and associated with a particular reply address. The mediator receives reply message(s) from the clients at the particular reply address, the reply message including the client identifier address and a reply generated at the client terminal device. The mediator sends the client terminal device(s)
(Continued)

service continuation information by which the client(s) can continue service provisioning in a second communication format which is different from the first communication format.

50 Claims, 10 Drawing Sheets

Related U.S. Application Data continuation-in-part of application No. 13/529,737, filed on Jun. 21, 2012, now Pat. No. 8,737,955, and a continuation-in-part of application No. 13/529,776, filed on Jun. 21, 2012, now Pat. No. 8,737,959, said application No. 13/529,737 is a continuation-in-part of application No. 13/452,229, filed on Apr. 20, 2012, now Pat. No. 8,737,958, said application No. 13/616,525 is a continuation-in-part of application No. 13/452,311, filed on Apr. 20, 2012, now Pat. No. 8,737,954, and a continuation-in-part of application No. 13/452,229, said application No. 13/529,776 is a continuation-in-part of application No. 13/452,311, said application No. 13/452,229 is a continuation-in-part of application No. 13/332,409, filed on Dec. 21, 2011, now Pat. No. 9,406,032, said application No. 13/616,525 is a continuation-in-part of application No. 13/332,409, said application No. 13/452,311 is a continuation-in-part of application No. 13/332,409, which is a continuation-in-part of application No. 13/074,037, filed on Mar. 29, 2011, now Pat. No. 9,406,062, said application No. 13/616,525 is a continuation-in-part of application No. 13/074,037, and a continuation-in-part of application No. 13/039,338, filed on Mar. 3, 2011, now Pat. No. 8,634,522, and a continuation-in-part of application No. 13/002,512, filed as application No. PCT/FI2009/050611 on Jul. 3, 2009, now Pat. No. 8,825,774, said application No. 13/616,525 is a continuation-in-part of application No. 12/972,610, filed on Dec. 20, 2010, now Pat. No. 9,177,268, and a continuation-in-part of application No. 12/958,870, filed on Dec. 2, 2010, now Pat. No. 9,461,951, and a continuation-in-part of application No. 12/944,749, filed on Nov. 12, 2010, now Pat. No. 8,666,380, and a continuation-in-part of application No. 12/401,392, filed on Mar. 10, 2009, now Pat. No. 9,937,531, and a continuation-in-part of application No. 12/226,876, filed as application No. PCT/FI2007/050230 on Apr. 26, 2007, now Pat. No. 8,260,330, said application No. 13/616,525 is a continuation-in-part of application No. 12/226,878, filed as application No. PCT/FI2007/050229 on Apr. 26, 2007, now Pat. No. 8,254,531, said application No. 13/039,338 is a continuation of application No. 11/885,748, filed as application No. PCT/FI2006/050517 on Nov. 27, 2006, now Pat. No. 7,912,190, said application No. 12/958,870 is a continuation-in-part of application No. 11/980,470, filed on Oct. 31, 2007, now Pat. No. 8,050,664, said application No. 12/944,749 is a continuation of application No. 11/980,470, said application No. 12/972,610 is a continuation of application No. 11/980,470, said application No. 13/074,037 is a continuation-in-part of application No. 10/734,352, filed on Dec. 11, 2003, now Pat. No. 9,313,161, said application No. 10/734,352 is a continuation of application No. 10/227,194, filed on Aug. 21, 2002, now Pat. No. 7,406,429, said application No. 11/980,470 is a continuation of application No. 10/227,194, filed on Aug. 21, 2002, now Pat. No. 7,406,429.

(30) Foreign Application Priority Data

May 2, 2006 (FI) .................................. 20060419
May 2, 2006 (FI) .................................. 20060420

(51) Int. Cl.

| H04L 29/06 | (2006.01) |
|---|---|
| H04L 12/58 | (2006.01) |
| H04L 29/12 | (2006.01) |
| G06Q 10/02 | (2012.01) |
| G06Q 10/10 | (2012.01) |
| G06G 1/00 | (2006.01) |
| G08G 1/00 | (2006.01) |

(52) U.S. Cl.

CPC .......... *H04L 51/28* (2013.01); *H04L 61/2007* (2013.01); *H04L 63/08* (2013.01); *H04L 67/02* (2013.01); *H04L 67/42* (2013.01); *H04W 4/14* (2013.01); *G08G 1/207* (2013.01); *H04L 51/14* (2013.01)

(58) Field of Classification Search

CPC ..... H04L 61/2007; H04L 61/02; H04L 67/42; H04W 4/14
USPC .................................................. 709/202, 206
See application file for complete search history.

(56) References Cited

U.S. PATENT DOCUMENTS

| 5,940,818 | A | 8/1999 | Malloy et al. |
| 5,987,467 | A | 11/1999 | Ross et al. |
| 6,003,036 | A | 12/1999 | Martin |
| 6,047,270 | A | 4/2000 | Joao et al. |
| 6,085,100 | A | 7/2000 | Teemu |
| 6,104,870 | A | 8/2000 | Frick et al. |
| 6,199,076 | B1 | 3/2001 | Logan et al. |
| 6,236,968 | B1 | 5/2001 | Kanevsky et al. |
| 6,539,360 | B1 | 3/2003 | Kadaba |
| 6,560,456 | B1 | 5/2003 | Lohtia et al. |
| 6,564,261 | B1 | 5/2003 | Gudjonsson et al. |
| 6,577,614 | B1 * | 6/2003 | Cook .................... H04W 76/04 370/338 |
| 6,625,461 | B1 | 9/2003 | Bertacchi |
| 6,639,919 | B2 | 10/2003 | Kroninger et al. |
| 6,772,336 | B1 | 8/2004 | Dixon, Jr. |
| 6,873,688 | B1 | 3/2005 | Aarnio |
| 6,990,332 | B2 | 1/2006 | Vihinen |
| 7,149,537 | B1 | 12/2006 | Kupsch et al. |
| 7,154,060 | B2 | 12/2006 | Rosenbaum et al. |
| 7,177,909 | B2 * | 2/2007 | Stark ...................... G06F 21/31 709/206 |
| 7,222,081 | B1 | 5/2007 | Sone |
| 7,272,662 | B2 | 9/2007 | Chesnais et al. |
| 7,406,429 | B2 | 7/2008 | Salonen |
| 7,451,118 | B2 | 11/2008 | McMeen et al. |
| 7,610,208 | B2 | 10/2009 | Salonen |
| 7,610,224 | B2 | 10/2009 | Spiegel |
| 7,619,584 | B2 | 11/2009 | Wolf |
| 7,660,397 | B2 | 2/2010 | Heen et al. |
| 7,844,674 | B2 | 11/2010 | Madams et al. |
| 7,912,190 | B2 | 3/2011 | Salonen |
| 7,996,023 | B2 | 8/2011 | McGary et al. |
| 8,050,664 | B2 | 11/2011 | Salonen |
| 8,145,245 | B2 | 3/2012 | Aulu |
| 8,359,242 | B2 | 1/2013 | Guillot |
| 8,634,522 | B2 | 1/2014 | Salonen |
| 9,288,315 | B2 * | 3/2016 | Salonen ................. G06Q 10/02 |
| 2001/0037264 | A1 | 11/2001 | Husemann et al. |
| 2001/0049785 | A1 | 12/2001 | Kawan et al. |

(56) References Cited

U.S. PATENT DOCUMENTS

| | | |
|---|---|---|
| 2002/0028686 A1 | 3/2002 | Kagi |
| 2002/0032589 A1 | 3/2002 | Shah |
| 2002/0035539 A1 | 3/2002 | O'Connell |
| 2002/0040330 A1* | 4/2002 | Kido .................. G06Q 30/02 705/26.1 |
| 2002/0059146 A1 | 5/2002 | Keech |
| 2002/0080822 A1 | 6/2002 | Brown et al. |
| 2002/0104007 A1 | 8/2002 | Moodie et al. |
| 2002/0111914 A1 | 8/2002 | Terada et al. |
| 2002/0116333 A1 | 8/2002 | McDonnell et al. |
| 2002/0128908 A1 | 9/2002 | Levin et al. |
| 2002/0165000 A1 | 11/2002 | Fok |
| 2002/0173319 A1 | 11/2002 | Fostick |
| 2002/0178122 A1 | 11/2002 | Maes |
| 2002/0180696 A1 | 12/2002 | Maritzen et al. |
| 2002/0184509 A1 | 12/2002 | Scheidt et al. |
| 2002/0188562 A1 | 12/2002 | Igarashi |
| 2002/0191795 A1 | 12/2002 | Wills |
| 2003/0005126 A1 | 1/2003 | Schwartz et al. |
| 2003/0028782 A1 | 2/2003 | Grundfest |
| 2003/0051170 A1 | 3/2003 | Spearman |
| 2003/0101071 A1 | 5/2003 | Salonen |
| 2003/0163536 A1 | 8/2003 | Pettine, Jr. |
| 2003/0211844 A1 | 11/2003 | Omori |
| 2004/0097247 A1 | 5/2004 | Vilkuna et al. |
| 2004/0128158 A1 | 7/2004 | Salonen |
| 2004/0128173 A1 | 7/2004 | Salonen |
| 2004/0139318 A1 | 7/2004 | Fiala et al. |
| 2004/0157628 A1 | 8/2004 | Daniel et al. |
| 2004/0185883 A1 | 9/2004 | Rukman |
| 2004/0198322 A1 | 10/2004 | Mercer |
| 2004/0203619 A1 | 10/2004 | Tissot |
| 2005/0027608 A1 | 2/2005 | Wiesmuller et al. |
| 2005/0044042 A1 | 2/2005 | Mendiola et al. |
| 2005/0054286 A1 | 3/2005 | Kanjilal |
| 2005/0065995 A1 | 3/2005 | Millstein et al. |
| 2005/0102230 A1 | 5/2005 | Haidar |
| 2005/0171738 A1 | 8/2005 | Kadaba |
| 2005/0246209 A1 | 11/2005 | Salonen |
| 2005/0268107 A1 | 12/2005 | Harris et al. |
| 2006/0010085 A1 | 1/2006 | McMeen et al. |
| 2006/0040682 A1 | 2/2006 | Goertz et al. |
| 2006/0075139 A1 | 4/2006 | Jungck |
| 2006/0131385 A1 | 6/2006 | Kim |
| 2006/0168064 A1 | 7/2006 | Huynh et al. |
| 2006/0224407 A1 | 10/2006 | Mills |
| 2006/0271551 A1 | 11/2006 | Suojasto |
| 2007/0010266 A1 | 1/2007 | Chaudhuri |
| 2007/0047533 A1 | 3/2007 | Criddle et al. |
| 2007/0105536 A1 | 5/2007 | Tingo, Jr. |
| 2007/0123246 A1 | 5/2007 | Daniel et al. |
| 2007/0135101 A1 | 6/2007 | Ramati et al. |
| 2007/0143230 A1 | 6/2007 | Narainsamy et al. |
| 2007/0202894 A1 | 8/2007 | Dhebri et al. |
| 2007/0239578 A1 | 10/2007 | Klemens |
| 2007/0277215 A1 | 11/2007 | Allen et al. |
| 2007/0288215 A1 | 12/2007 | Goldman |
| 2008/0147408 A1 | 6/2008 | Da Palma |
| 2008/0256191 A1 | 10/2008 | Murphy et al. |
| 2008/0285475 A1 | 11/2008 | Menditto |
| 2008/0317224 A1 | 12/2008 | Salonen |
| 2009/0104925 A1 | 4/2009 | Aula |
| 2009/0175422 A1 | 7/2009 | Marics et al. |
| 2009/0264100 A1 | 10/2009 | Sapir et al. |
| 2009/0281929 A1 | 11/2009 | Boitet et al. |
| 2010/0030689 A1 | 2/2010 | Ramos et al. |
| 2013/0266004 A1* | 10/2013 | Nunez Sanz ..... H04L 29/06068 370/354 |

FOREIGN PATENT DOCUMENTS

| | | |
|---|---|---|
| EP | 0967754 A2 | 12/1999 |
| EP | 1065899 A1 | 3/2001 |
| EP | 1139233 A1 | 10/2001 |
| EP | 1458201 A1 | 9/2004 |
| EP | 1546938 A1 | 6/2005 |
| FI | 20011680 A | 2/2003 |
| FI | 000117663 B | 12/2006 |
| FI | 20060387 A | 10/2007 |
| FI | 000118586 B | 12/2007 |
| GB | 2391646 A | 11/2004 |
| GB | 2435565 A | 8/2007 |
| KR | 20040013261 A2 | 2/2004 |
| WO | 9706603 A2 | 2/1997 |
| WO | 0041102 A2 | 7/2000 |
| WO | 0052601 A1 | 9/2000 |
| WO | 01013299 A2 | 2/2001 |
| WO | 0139033 A1 | 5/2001 |
| WO | 0153991 A1 | 7/2001 |
| WO | 2002067602 A1 | 8/2002 |
| WO | 2004019223 A1 | 3/2004 |
| WO | 2006122399 A1 | 11/2006 |
| WO | 2007063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Content Gateway, Version 4.0; Development and Billing Manual; Jan. 1, 2005, Telia Sonera Finland Oy; www.sonera.fi/files/sonera.fi/.

Elisa Plc's Press Release; BookIT Ltd. and Elisa Implement a Handy Mobile Phone-Enabled Check-In Service for Finnair; Jun. 9, 2004; www.elisa.fi.

Elisa Plc's Press Release; Innovative Solution Receives 2004 European Good Practice Award in Occupational Health and Safety and the appendix BookIT case.pdf; Nov. 22, 2004.

Empower Interactive Group Ltd.; Virtual Mobile Redirector—Product Information Document; Unknown 2001.

Finnair Plc's Press Release; Finnair to Introduce the World's Easiest Check-In with a Text Message; Jun. 9, 2004; www.bookit.net/news.

Finnish Search Report; dated May 4, 2006.

Finnish Search Report; dated Jun. 3, 2009.

Kauppalehti; Mobiilipalvelujen Oltava Yksinkertaisia; BookIT:n Jukka Salonen uskoo tavallisiin tekstiviesteihin; Heikki Nenonen; Jun. 9, 2005; p. 19.

Mobileway; Mobileway Launches its Mobile Transaction Tracker Solution—An Interactive Platform to Authenticate Macropayment Made by Mobile Consumers; Jul. 2002; pp. 1-2; United States.

Mouly et al.; The GSM System for Mobile Communications; Unknown 1992; pp. 556-560; Palaiseau.

Penttinen; GSM-tekniikka; WSOY; Unknown 1999; pp. 155-157, 222 and 331-332; Porvoo.

Verkkouutiset; Sonera Tarjoaa Matkaviestinoperaattoreille Content Gateway—Palvelualustaa; Feb. 21, 2001; www.verkkouutiset.fi.

* cited by examiner

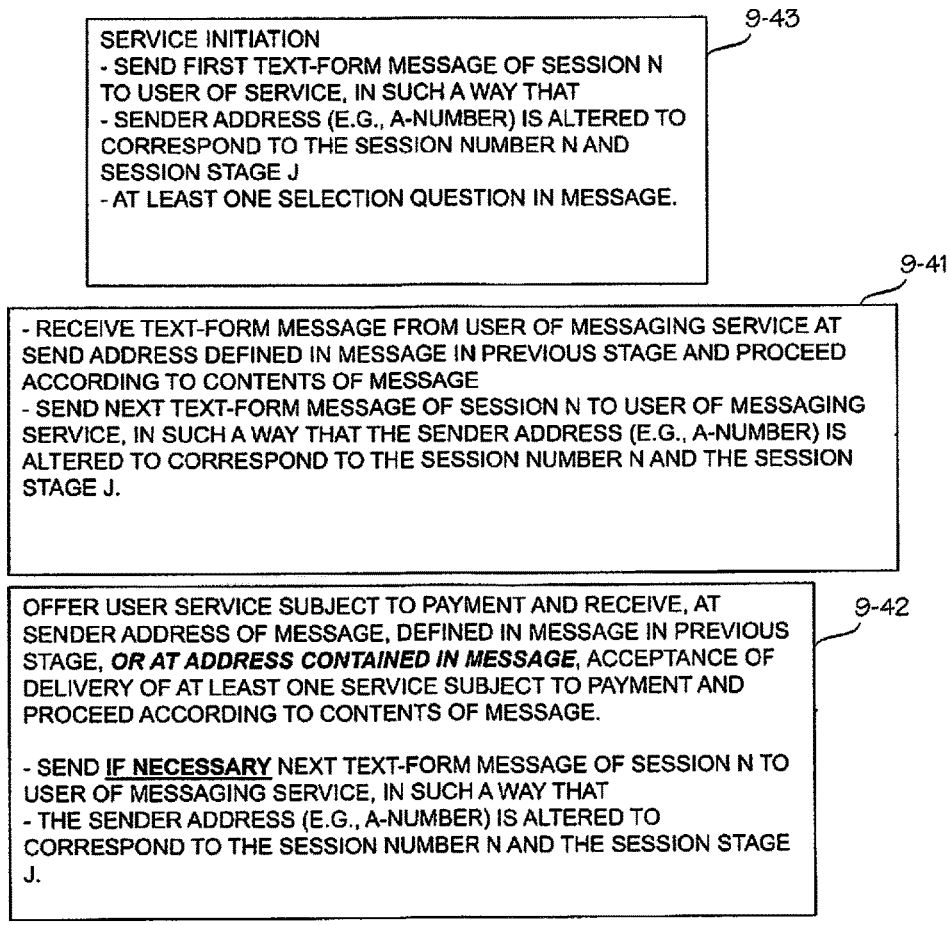

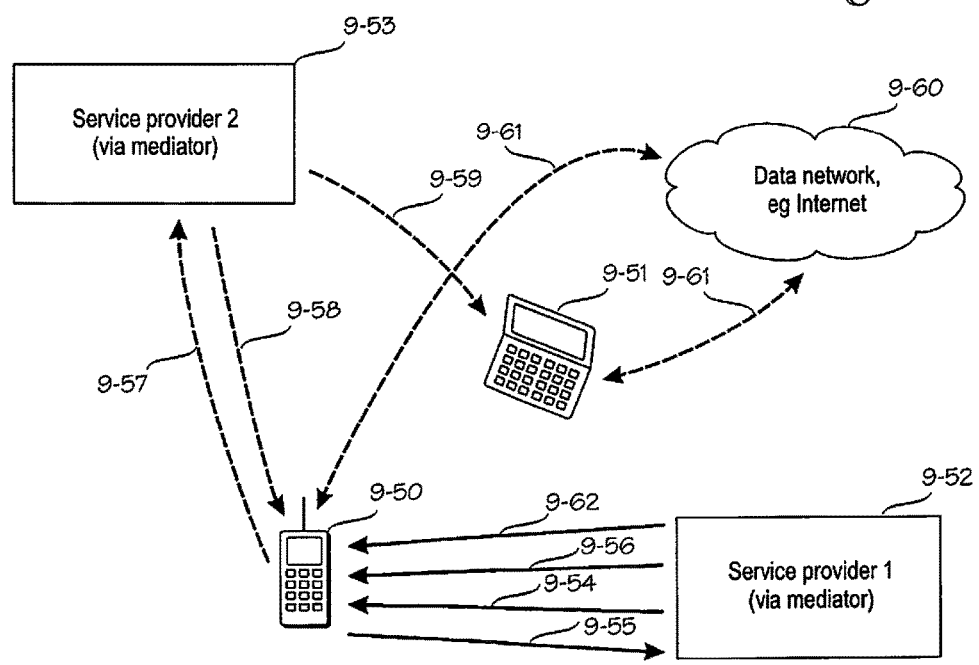

ND SYSTEM FOR MEDIATING
AND PROVISIONING SERVICES

PARENT CASE INFORMATION

The present invention claims benefit from the following commonly owned earlier applications: 1) Ser. No. 12/944,749, title "Communication Method and System", filed Nov. 12, 2010, claiming priority from FI 20011680, filed Aug. 21, 2001; 2) Ser. No. 13/002,512, title "Method and System for Sending Messages", filed Jul. 3, 2009, claiming priority from FI 20085701, filed Jul. 4, 2008; 3) Ser. No. 13/074,037, title "Authentication Method and System", filed Mar. 29, 2011, claiming priority from FI 20011680, filed Aug. 21, 2001; 4) Ser. No. 13/039,338, title "Method and System for the Mass Sending of Messages", filed Mar. 3, 2011, claiming priority from FI 20051245, filed Dec. 2, 2005; 5) Ser. No. 12/972,610, title "Booking Method and System", filed Dec. 20, 2010, claiming priority from FI 20011680, filed Aug. 21, 2001; 6) Ser. No. 12/958,870, title "Communication Method and System", filed Dec. 2, 2010, claiming priority from FI 20011680, filed Aug. 21, 2001; 7) Ser. No. 12/401,392, title "Method and System for Delivery of Goods", filed Mar. 10, 2009; 8) Ser. No. 12/226,878, title "Method and System for Combining Text and Voice Messages in a Communications Dialogue", filed Apr. 26, 2007, claiming priority from FI 20060419, filed May 2, 2006; 9) Ser. No. 12/226,876, title "Method and System for Combining Text and Voice Messages in a Communications Dialogue", filed Apr. 26, 2007, claiming priority from FI 20060420, filed May 2, 2006; 10) Ser. No. 13/332,409, title "Financial Fraud Prevention Method and System", filed 21 Dec. 2011; 11) Ser. No. 13/452,229, filed 20 Apr. 2012; 12) Ser. No. 13/452,311, filed 20 Apr. 2012; 13) Ser. No. 13/529,776, filed 21 Jun. 2012; 14) Ser. No. 13/529,737, filed 21 Jun. 2012; and 15) Ser. No. 13/616,525, filed 14 Sep. 2012, title "Method and System for Mediating and Provisioning Services". Numbers 11-14 are all titled "Managing Recurring Payments from Mobile Terminals", and all claim priority from multiple applications, including FI 20011680, filed Aug. 21, 2001. The entire contents of the above-identified parent applications is incorporated herein by reference.

FIELD OF THE INVENTION

The present invention relates to telecommunications. The invention is applicable to methods and systems for session management, authentication and/or verification via one or more telecommunications networks.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

Interoperability of different services and terminal devices requires standards on several levels. It is not enough to have, say, common communication protocols. It would be very important to share common concepts and understanding what a certain piece of data means in a certain context. However, it has been very difficult to agree on those issues, as there exists an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

Additionally, such services as well as other services/companies such as banks and credit card companies have long had the problem of verifying that the user attempting to make a reservation, booking or purchase is the actual user that they claim to be. Similarly, customers would like to know that the information that they are providing to these services/companies is going to the actual company and that their information is secure. With identity fraud resulting from submitting personal information over the internet being a concern for many web users there exists the need for a safer authentication alternative than currently exists.

Companies and organizations, such as software developers and pharmaceutical companies, have for a long time dealt with the problem of piracy. Not only are such entities harmed by lost sales from counterfeit goods but consumers who unknowingly purchase counterfeit goods can be harmed by, for example, malware installed by hacked software or poor quality and mislabeled counterfeit drugs. Currently, such companies are trying to develop methods in which the authenticity of their products can be easily determined by their customers either prior to purchase or prior to use.

For services such as booking or calendar functions, information exchange often takes place as synchronizing booking or calendar entries. For that purpose, several important standardization efforts are going on. For example, SyncML is an industry initiative to develop and promote a single, common data synchronization protocol.

vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

A common problem with all of these existing solutions is that they do not provide common semantics for different systems and the transfer of information may not always be as secure, or at least perceived as secure by customers, as many customers wish. Another problem is that booking systems have multiple different and usually quite complex user interfaces. If a customer wants to both make an appointment with a dentist and book a taxi to take him or her there, the customer needs to enter all the booking information to both booking systems in different ways. While the dentist may have in place a secure method of making reservations, authenticating the client who makes the reservation and receiving payment for a booking, the taxi company may not.

Additionally, it becomes challenging to manage client replies for instance when a client has been given a number of questions. For example, it makes sense to use SMS text messages to ask a client which option he or she chooses, because in many countries, like in Finland, it is very common to communicate with SMS text messages and they create revenues to operators. However, if a client replies to several inquiries by sending a number of text messages, it can be troublesome to find out, which answer corresponds to a certain question because the reply does not automatically include a reference to the question. Say, a service asks a client if they want to reserve, in addition to a flight ticket, also a taxi and a hotel room, and the client replies "yes" to one question but "no" to the other, the service does not necessarily know which offer the client has accepted.

Other problems, such as clients not showing up for appointments, not using a service more than once or long intervals between use of a service can be addressed through the use of new systems and methods.

Accordingly, attempts to execute financial transactions wherein clients utilize mobile terminals without additional proprietary software are handicapped by limitations of current mobile communication protocols, such as the short message service (SMS). Notably, the SMS protocol provides no standardized manner for authenticating mobile users or managing sessions. Lack of standardized authentication techniques leaves systems vulnerable to fraud, while lack of standardized session management makes it difficult for service providers to keep track of which of the clients' responses correspond to which questions from the service provider. On the other hand, session management, fraud prevention and introduction of new services should not be overly complex.

SUMMARY OF THE INVENTION

It is an object of the present invention to alleviate one or more of the problems identified above. Specifically, it is an object of the present invention to provide methods and equipment that provide improvements with regard to one or more of session management, authentication, fraud prevention and smooth introduction of services.

Embodiments of the invention can be utilized in a system that comprises or supports one or more payment processor computers, one or more service provider computers and one or more mediator servers.

An aspect of the present invention is a method for utilizing a mediator server controlling communication between a plurality of clients and at least one service provider, wherein each client is associated with a client identifier address and uses a client terminal device to communicate with the mediator server, wherein the mediator server is configured to use a plurality of mediator server addresses for receiving communications from the client terminal device regarding the at least one service provider;

the method comprising performing the following acts for each of several pairs of client and service provider:

sending to the client terminal device a set of two or more inquiry messages pertaining to the service provider, wherein at least a first one of the inquiry messages is in a first communication format, wherein each of the one or more inquiry messages is associated with a particular reply address, which is selected from the plurality of mediator server addresses;

receiving, from the client terminal, one or more reply messages to the inquiry messages at the particular reply address associated with the reply message, the reply message including the client identifier address and a reply generated at the client terminal device;

sending to the client terminal device service continuation information by which the client terminal is able to continue service provisioning in a second communication format which is different from the first communication format.

Use of different communication formats (or protocols) offers operators and service providers more options for communication with the client terminal devices, fraud prevention, authentication and session management (keeping track of which answers relate to which questions). The service continuation information, by which the client terminal is able to continue service provisioning in a different communication format, may be sent in one of the inquiry messages or in a separate message.

The mediator is a data processing system, server or device configured to mediate information between the client terminal devices and the service provider(s). The service provider(s) is/are entities providing services to the clients that operate the client terminal devices. The service-providing entities operate service providing servers, computers or communicating devices configured to communicate indirectly with the client terminal devices. As used herein, indirect communication between the service providing servers, computers or communicating devices on one hand and the client terminal devices on the other hand means that such indirect communication is mediated by the mediator according to the present invention.

The detailed description of the present application contains numerous examples wherein the service providers offer services related to travelling, transportation, accommodation, or the like. Some of the commonly owned earlier applications, particularly those titled "Financial Fraud Prevention Method and System" and "Managing Recurring Payments from Mobile Terminals" contain examples wherein the service providers offer services related to financial transactions. The entire contents of the commonly owned earlier applications are included herein by reference.

Accordingly, it is another aspect of the present invention to provide a method for utilizing a service provider's data processing system to communicate with the mediator so as to cause the mediator to perform the method described earlier. Typically the service provider's data processing system causes the mediator to perform the inventive method by sending appropriate signals to the mediator server over a data network, such as the internet.

Yet other aspects of the present invention include apparatuses and software products for the mediator on one hand and the service provider's data processing system on the other hand.

In some implementations either the first communication format or the second communication format is based on technology in which a reply to an incoming message does not automatically include an explicit reference to the incoming message. A typical but non-restrictive example of such a communication format is a message compliant with Short Message System ["SMS"], and the other communication format, which is not compliant with SMS, comprises at least one of a network address and a reference to a network address. By way of example, said at least one of the network address and the reference to the network address may be provided in a link formatted so as to be activated upon a user navigation act to the link. Such links, or any other forms of service continuation information, by which the client terminal is able to continue service provisioning in a different communication format, may be sent as part of the inquiry messages or in separate messages.

In some implementations the communication format that is not compliant with SMS is a voice call and the network address comprises at least one telephone number of a recipient of the voice call. In other implementations the communication format that is not compliant with SMS is an e-mail and the network address comprises at least one e-mail address.

Yet further the communication format that is not compliant with SMS may comprise Hypertext Mark-up Language ["HTML"] messages and the network addresses may comprise Uniform Resource Locators ["URL"] or Internet Protocol ["IP"] address.

While any variation of the particular reply address from one inquiry message to the next facilitates session management (keeping track of which answers relate to which questions) fraud prevention can be further improved by implementations wherein the particular reply address associated with the each of the one or more inquiry messages is not unambiguously derivable from information other than the inquiry message that the particular reply address is associated with. What this means is that anyone seeing the particular reply address that the mediator server has associated with one inquiry message cannot deduce which reply address the mediator server will associate with the next inquiry message. For example, the mediator server may select the particular reply address at random or by utilizing a pseudo-random sequence in which a prior member of a chain of reply addresses does not reveal any subsequent members in the chain.

The mediator server can determine which reply message was received from each of the plurality of the clients by using at least two information items selected from: the client identifier address, the particular reply address at which the received reply message was received and the reply generated at the client terminal device. By determining which of the inquiry messages have been replied to by the client terminal, the mediator server may re-use the particular reply addresses for the same client terminal. Alternatively or additionally, the mediator server may re-use the particular reply addresses if a lifetime of the inquiry message has expired. In some implementations at least one of the inquiry messages may contain an ordered list of choices and the act of receiving the reply message from the client terminal comprises processing a selection of the choices made at the client terminal device.

BRIEF DESCRIPTION OF THE DRAWINGS

In the following section, specific embodiments of the invention will be described in greater detail in connection with illustrative but non-restrictive examples. A reference is made to the following drawings:

FIG. 9C shows a block diagram of the solution according to an embodiment of the invention;

FIG. 9D schematically shows the system according to an embodiment of the invention.

DETAILED DESCRIPTION OF SOME SPECIFIC EMBODIMENTS

Figure 1:
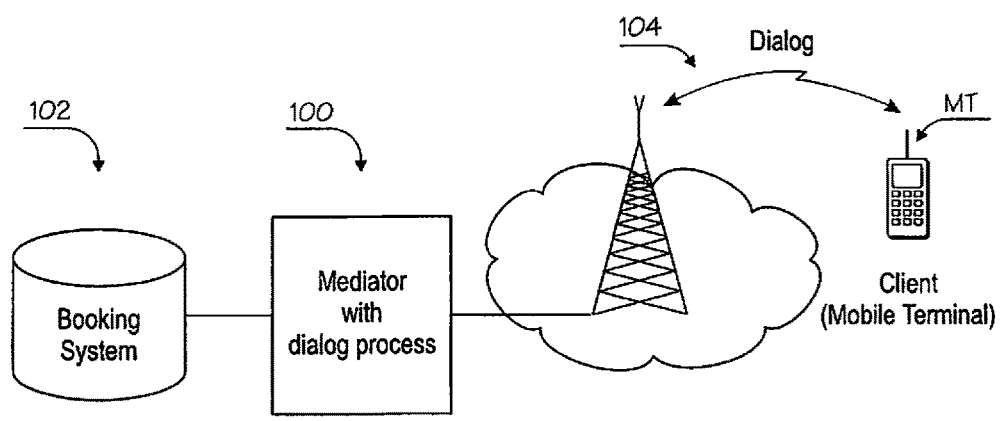
FIG. 1 shows a mediator that mediates services between a service provider and a representative mobile terminal, wherein the service being provided is a booking service.

This detailed section begins with a description of session management and authentication, with reference to FIGS. 1 through 8 and 9A through 9D. It will be appreciated that the techniques for session management and authentication, as described in connection with FIGS. 1 through 8, are applicable to a wide range of services. Further service-provisioning examples are provided in the above-identified commonly owned US patent applications, the disclosure of which is incorporated herein by reference. FIG. 10 relates to an exemplary hardware description for the various servers and mediators.

The techniques disclosed herein can be used to provide a wide range of financial services and transactions, including but not limited to: booking of a primary service; booking of a related service that relates to the primary service; executing payment for the primary and/or related services. An illustrative but nonexhaustive list of services includes transportation, accommodation, nutrition, entertainment, content delivery, payment confirmation, services relating to health or appearances, consultation or other services. From the point of view of the technical problems to be solved, namely session management, authentication, fraud prevention and/or ease of service provisioning, no distinction needs to be made between services and physical objects. In other words, acquirement (eg purchase, loan, lease) of an object is an example of a service requested by a mobile user and offered by a service provider.

The service providers are those with whom clients want to make appointments, reservations, or other bookings and comprise the resources for the booking system to allocate. Service providers conduct business through service provider booking services. As used in this application, the mediator is a network-based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages.

Of course, a system that is capable of handling SMS messages will also handle other clients with greater capabilities. In some implementations the mediator may communicate with mobile telephone clients through an SMS gateway. As is well known, SMS gateways are operated by mobile network operators. The mediator communicates with clients using dialogs. In some implementations, the dialogs are short messages which present information to the client and allow a simple reply. The dialogs preferably provide users with simple choices, such as a selection between "yes" and "no", or a simple selection from an ordered list. Dialogs can also be one way, such as an acknowledgment to a reservation. A transaction may typically involve a sequence of dialogs each involving a simple response. Dialogs involve asynchronous communication by messages. The system as described makes it possible to coordinate bookings among different service provider systems in order to fill a clients need, for example coordination of an airline booking with transportation to the airport.

Figure 2:
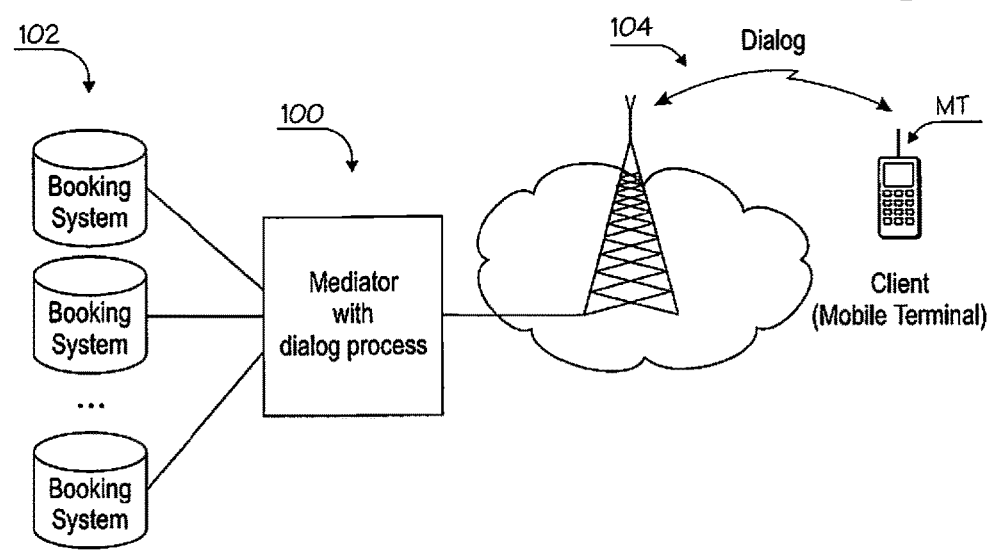
FIG. 2 shows a version of the mediator that is capable of serving multiple service providers.
Figure 3:
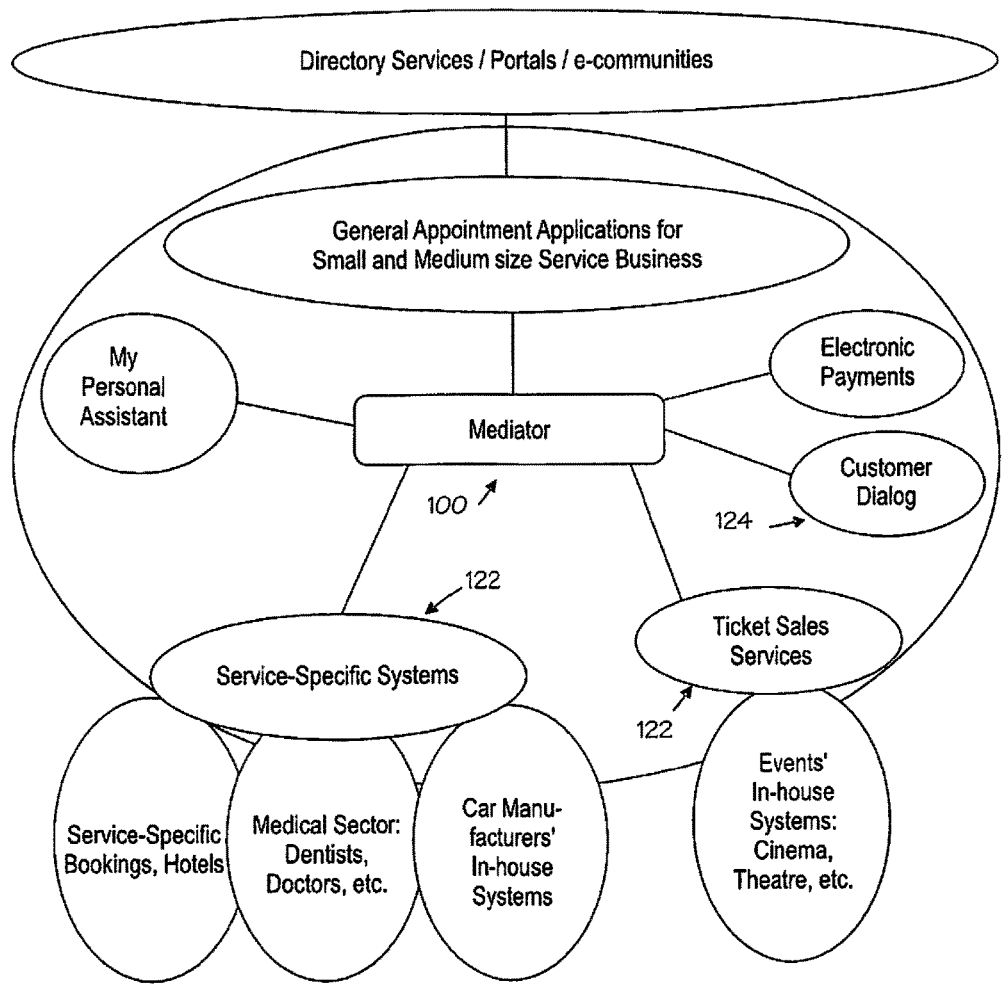
FIG. 3 represents a more detailed view of the system shown in FIG. 2.

FIG. 1 is a diagram of a simple system, wherein reference numeral 100 denotes a mediator, reference numeral 102 denotes a service provider's booking system, which is in communication connection with the mediator 100 over a data network, such as the internet. Reference numeral 104 denotes a user terminal having a dialog with the mediator 100 over a mobile network. FIG. 2 shows a plurality of service provider booking systems communicating with a mediator over a network. FIG. 3 shows a mediator 100 communicating with various service provider systems and users with telephone devices communicating dialogs.

A reason-based customer dialog is a desirable improvement from the client's point of view, because service providers can create their own dialogs for with each different kind of booking event. A dialog is closely related to a certain booking situation. A dialog may become activated automatically at the right moment, or the client can activate the dialog as needed, or another entity in the system can send a message to the dialog process of the mediator to activate the dialog. The dialog process then sends an inquiry to another entity in the system or informs the client and possibly inquires client's choices. By means of this kind of dialog, the client can make reservations in several booking systems using only one user interface. The dialog process connects to remote booking systems over an appropriate data network, such as the Internet or mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialog between the client, the mediator and the booking systems as well as stored customer profiles ensure that the client gets the reason-based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a mediator, a dialog process, a service provider, and a service provider booking system, can be on one of the following levels:

1. There is a predetermined set of dialogs in the system. Their content and the possible choices are set in advance. For example, if a client books a flight, a dialog always offers certain other bookings. Client's prior actions are not taken into consideration.
2. There is an unlimited number of dynamic or "intelligent" dialogs that are based on, for instance, a profile that a client has created himself or herself, usage history records, and client's location. Simple logic supports decisions. It is a low-level expert system.
3. The system is able to make decisions by itself and to support client's decision making. On this level, a dialog process may include a high-level expert system. It can act as an agent and negotiate with several service providers to get the best offer without client's direct involvement.

In one exemplary use case, a client books a service from a service provider. The booking may be carried out using a terminal that is connected to the mediator service. First, the client connects to the mediator service using a dialog. The client inputs a reservation inquiry to the dialog process that sends the inquiry to the mediator. The mediator inquires possible reservations from the service provider's information system using concepts and terminology that those services are able to interpret. The inquiry is based on client's preferences. The client discloses some preferences that are related to the specific booking when they enter the reservation inquiry to the dialog. In addition, the dialog process and the mediator service may have stored a client's general preferences and use them so that the client do not need to input all the preferences each time.

In some implementations, management of the inquiry and booking processes may be based on sophisticated state models. Each booking process involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A specific booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialog process that shows a simple list of options to the client. For example, the dialog process may show three options for a flight and ask if the client also wants to reserve a taxi that is actually already tentatively booked by the mediator. The client makes his or her decision by choosing the options from the simple list of alternatives. The dialog process sends information on the client's choice to the mediator that confirms the bookings in accordance with client's choices and cancels the unnecessary reservations.

Figure 4:
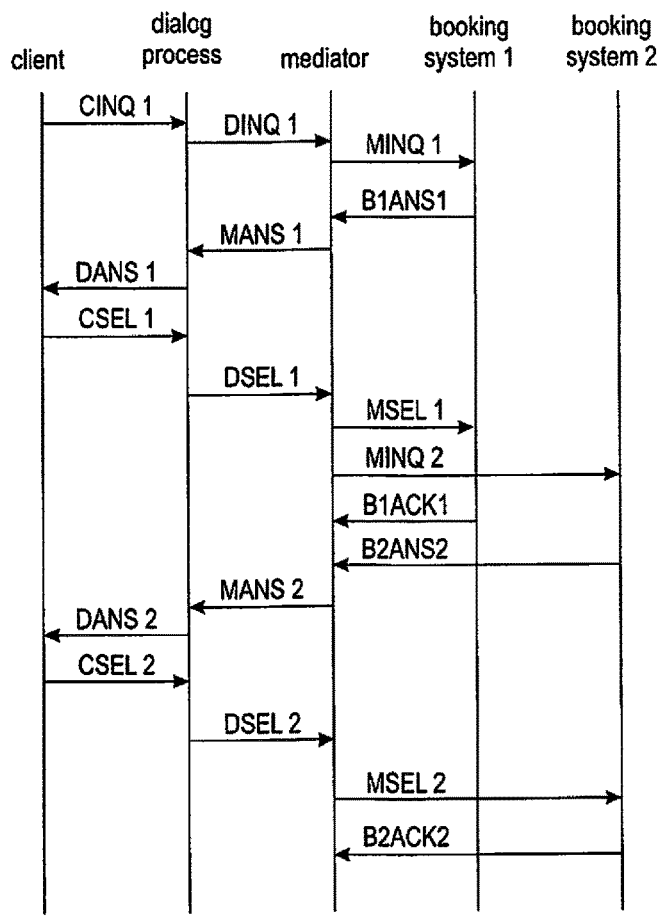
FIGS. 4 and 5 are signaling diagrams depicting typical use cases in a system as shown in FIGS. 1 through 3.

FIG. 4 shows a sequence diagram of an inquiry CINQ1 originated by a client using a dialog DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
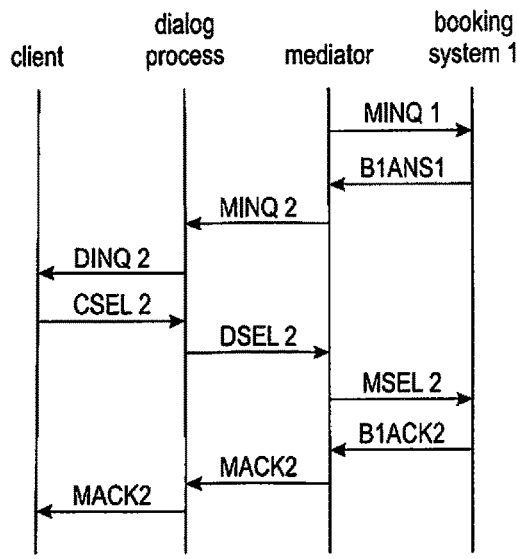

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialog shows the options in a simple and handy way. The client needs only to choose which option is the best for him or her or whether he or she wants to get new options or postpone the booking. FIG. 5 is a time sequence chart for a situation where the original inquiry, MINQ1, was initiated by the mediator.

Example 1

An Exemplary Booking System

Referring now to FIG. 3, an exemplary environment in which the invention can be utilized for management of bookings will be described below. In the implementation currently described, the mediator 100 is designed to interface with various service-specific systems generally denoted by reference numeral 122. These systems may be used to provide the services (including physical goods) described earlier. In a typical implementation, the mediator 100 interfaces to the service-specific systems 122 over a data network such as the Internet. The mediator 100 further interfaces to client terminals, such as mobile terminals capable of receiving text messages, over a mobile network. On a logical level, interfacing of the mediator 100 to the various service-specific systems 122 and other parties may be accomplished by means of generic XML definitions. For the exemplary case of managing of booking reservations, the mediator 100 may support vCard and vCalendar standards, since they are used by many major booking and calendar systems.

In the presently-described implementation, the mediator 100 communicates with the mobile terminals and their users using Short Message Service (SMS) via an SMS Gateway for asynchronous communication. The mediator 100 may comprise a customer dialog process 124 configured to use Dynamic Dialog Matrix (DDM) technique, which may be used to facilitate authentication and/or session management, as will be described in more detail in connection with FIGS. 4 through 8 and 9A through 9D.

A clear distinction needs to be made between the booking processes of the ultimate service providers and those of the mediator. The booking processes of the ultimate service providers only cover normal booking with regard to time and resource reservation. The booking processes of the mediator comprise books ing, work, and financing. Both processes lead to the same point. In a typical implementation, the process of the mediator comprises seven phases as follows:

Phases (Status Handling)

The phases set up a coupling (analogous with a bond or rubber band) between the resources. In each phase of the mediator process, data related to the booking will be amended to reflect the needs of the phase in question. For the statuses and values please see the underneath table. The phases are described in more detail in the following discussion.

1. Filing

Filing means initialization of a mediator process and a booking process. As a result of the initialization an entry is inserted in the database with basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a) suggested start-time (ISO time-stamp w/time zone)
b) suggested start-location (coordinates)
c) suggested end-time (ISO time-stamp w/time zone)
d) suggested end-location (coordinates)

4. Confirming

Time and location as it is accepted by the resources that have accepted. Data related to this phase:
a) accepted start-time (ISO time-stamp w/time zone)
b) accepted start-location (coordinates)
c) accepted end-time (ISO time-stamp w/time zone)
d) accepted end-location (coordinates)

By default the data is copied from the Requesting and/or Scheduling phases. In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a) actual start-time (ISO time-stamp w/time zone)
b) actual start-location (coordinates)
c) actual end-time (ISO time-stamp w/time zone)
d) actual end-location (coordinates)
e) products used, extras, mileage, . . . .

By default the data is copied from the Confirming phase.

6. Accounting

At this point all data stored in the data structures on previous phases is analyzed and processed for invoicing purposes. Data related to this phase: Accounting data. To be defined separately.

7. Completing

The task has been completed. As regards the mediator processes, it is irrelevant whether the task succeeds or not. Success or failure of the task is relevant to the Accounting phase, in which the financial actions to the organizer are handled. In this phase, housekeeping (database contents; temporary files, etc.) is performed in order to complete the mediator process. The following table shows data available in each phase. Booking phase is with "XX".

| Phase/Data | Identifying | Resources | Suggested time | Accepted time | Task's work related | Accounting | Closing |
|---|---|---|---|---|---|---|---|
| Filing | X | | | | | XX | |
| Requesting | X | X | | | | XX | |
| Scheduling | X | X | X | | | XX | |
| Confirming | X | X | X | X | | XX | |
| Working | X | X | X | X | X | XX | |
| Accounting | X | X | X | X | X | X | |
| Completing | X | X | X | X | X | X | X |

Phase Statuses, Values, and Transitions

The following table describes the phases, their statuses, and values along with transition to next logical phase based on the values gotten. In addition, corresponding vCalendar statuses are shown when applicable.

| Phase | Status | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |

-continued

| Phase | Status | Next Phase | vEvent | vTodo |
|---|---|---|---|---|
| Confirming | Delegated | Requesting | Delegated | Delegated |
| Confirming | Re-scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| | | |
|---|---|---|
| <Phase y> | Paused | <Status x> |
| <Phase y> | Re-started | <Status x> |
| <Phase y> | Cancelled | Accounting |

Figure 7:
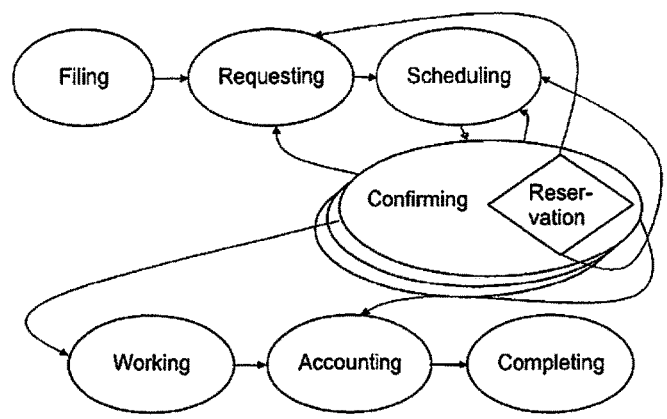
FIG. 7 shows detailed phases of the booking process which is an example of a service offered by a service provider.

FIG. 7 shows the work flow transitions from phase to phase. For conditions, see the table above. Also, please note that Canceled Status always leads to accounting.

Confirming the (Whole) Reservation

In order for the whole Reservation to be successful, all resources, which accepted the reservation, need to have the same scheduling. In addition, there will resources in different roles and data related to the working phase may vary greatly. The different statuses of the whole reservation are:
a) "NoReplies" (0) for "No-one hasn't replied to the request made by the organizer"
b) "NoDeclines" (1) for "Not all invitees have replied yet. The ones who have replied have accepted"
c) "AllAccepts" (2) for "all invitees have confirmed"
d) "SomeDeclines" (3) for "Some of the invitees have declined"
e) "AllDeclines" (4) for "All of the invitees have declined".

The following decision table helps in evaluating the status of the whole booking. "Maybe" means that this condition only does not incontestably specify true or false result.

| Booking Status/ Confirmations | No one answered | No one accepted | Some accepted | All accepted | No one declined | Some declined | All declined |
|---|---|---|---|---|---|---|---|
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

Figure 6:
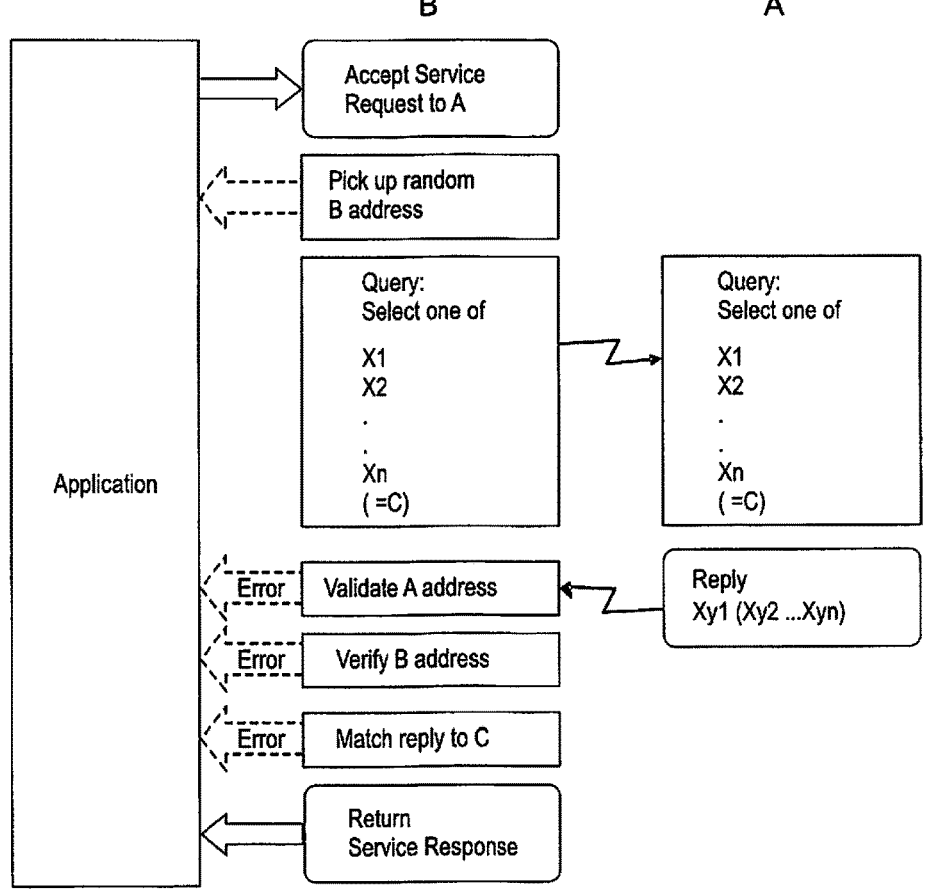
FIG. 6 shows an example of a dynamic dialog matrix being applied to a query and reply.

FIG. 6 shows an example of the dynamic dialog matrix applied to a query and reply. An application sends a service request to a user to a mediator B. The mediator B picks up random B address from a group of available B addresses wherein it can receive responses from the user. After defining the B address, the mediator B sends a query to user A, wherein the query may consist of a list of choices from which the user A may select the reply. The user A receives the query in their terminal and sends a reply to that query to the B address. The mediator B receives the user's reply in the B address. After receiving the reply from the user A, the mediator B processes the reply. First the mediator B validates the A address (which is the user's address). In case the A address does not correspond to the A address whereto the message was sent, the mediator B may inform the application that no response was received. In case the A address corresponds to the A address to which the mediator B has sent a query, the mediator B verifies the B address (the reply address into which the reply was received). Correspondingly, in case the B address is not a valid B address for the user, the mediator B may inform the application that no response was received. In case also the B address corresponds to the B address that the message was sent from, the mediator B matches the reply C to the list of available choices for that message. If the reply does not correspond to the available list of choices, the mediator B may send an error information to the application, or send a new query to the user A. If the reply corresponds to the available list of choices that was sent to the user, the mediator B sends a return service response to the application.

The system as described in connection with FIG. 6 may have a plurality of B subscriber addresses, such as telephone numbers, wherefrom the mediator B may select a subscriber number where the message to the user A is sent. Further, the user A preferably has a mobile telephone, having a mobile subscriber number, whereto the message is sent, and wherefrom the user A may respond to the query. The messages to and from the mediator B are sent over the telecommunication network.

A major problem solved by the dynamic dialog matrix is the challenge of managing client replies, when a client has been given a number of questions and the client is using SMS text messages or similar technology in which a reply does not automatically include an explicit reference to the inquiry. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you also need a taxi?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding cell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

The use of the Dynamic Dialog Matrix as described above is illustrated in FIG. 7. The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

An example is for authenticating a user who is making a purchase, eg purchasing a software product "ABC". The user first initiates a purchase request to the company/service, eg directly in the software program, via an internet website or via a mobile device. The company/service then knows the user name and possible other identification information and sends a request to a credit card company to request a payment. The credit card company then sends a request to a mediator to authenticate the purchase. The mediator knows the user and the user's mobile number and sends a message, eg SMS or MMS, to the user's known phone number. An example of a message could be:

"Dear Mr. Client, your credit card was used to purchase product ABC on 27 Mar. 2010 for 299 euros. Please reply:
y—to accept the payment on VISA xxxx xxxx xxxx 123
n—to reject the payment or
f—to report a fraud on your credit card".

By responding to the message from the known user's mobile number with an acceptable response allows the mediator to respond to the credit card company if the user authorizes the purchase or not. Thereafter, the credit card company may authorize the payment and inform the company/service. Additionally, if the mediator sends the message from a randomly chosen reply number as discussed above, there is an added layer of authentication. Because it is possible for a fraudulent user to determine a credit card holder's mobile number and fake a message from said number, it would be extremely improbable for them to know which reply number the authentication message would originate from. The above may also be used, for example, with money transfers between a user's bank and the company/service.

An additional element of safety and security can be achieved using semantic analysis. For example, if the user is asked to tell how many items are ordered, and the answer is "y" or "yes", then apparently the user did not know what the question was and the message was not an answer for the enquiry.

Such a system can also provide a level of security for the user. The mediator can authenticate the company/service, by any acceptable method, and only send authentication messages once the company/service has been authenticated. Then, if the user does not provide their mobile number when providing their identification information, when they get an authentication message, even from a number they do not recognize, they will know that the mediator has authenticated the company/service.

While the present example has been explained in terms of the mediator sending the message, the message could be sent by a secondary entity at the request of the mediator. For example, when the mediator receives a request to authenticate a transaction, the mediator can then provide the user's bank with the necessary transaction details and request that the bank send the necessary authentication method. Another example would be if the mediator sends a request to the bank for some of the user's identity information, eg mobile number, so that it can proceed with sending the actual request itself or through a tertiary service provider which handles the actual message sending.

Additionally, though the present example has been described with the transaction being the purchase of a product and authentication of the user for payment, the same system and similar method can be used for other transactions, such as the authentication of the purchased product.

The use of a Dynamic Dialog Matrix (DDM) allows for authentication and verification of products, services and transactions based on a plurality of combinations of data. Based on as little as two pieces of information from the DDM an entity can be verified. Based on more pieces of information from the DDM, a higher degree of verification can be achieved.

A DDM which is being used for verification purposes can contain, or have access to, multiple of some or all of the following: reply addresses used for sending messages, reply addresses for which messages are received, user addresses, questions, acceptable answers for questions, order of receiving answers and verification information (eg product keys, ID codes). A key to the DDM is that it allows verification between a company/service and a user through a mediator (and possibly through another party) by matching information that each entity knows and the others should not know. Some examples are as follows:

If a user downloads a piece of software from the internet they want to know that the software is legitimate, ie, not pirated or hacked, while software developers want to make sure that users are paying to activate their programs. Therefore, prior to use the user is requested to enter a product key. The user sends a message, eg SMS, to a number with a product ID code. If the ID code is valid and has not been previously registered then the user receives a message with the product key. Therefore, the DDM matches the user entered product ID code with an indicator if it has been registered to verify if a product key should be issued. A similar process could work in conjunction with the payment process described above. Once the purchase of the software is authenticated as described above then an additional message can be sent to the user with the applicable product key. A similar method and system can be used to verify the legitimacy of virtually any product, such as medicine or trademarked products. If the product has a code printed on the packaging and a known number associated with the products manufacturer or verification then a consumer can send a message to the known number with the product code to receive an indication if the code is valid and if it has been previously checked. Benefits to this system are that if pirated products do not have a code printed on the product or have an invalid code then the user will know right away. Additionally, if multiple users check the same code then the product manufacturer or verifier can check in to if the code has been reproduced by a manufacture of a pirated product. A further benefit to the system is that the product manufacturer can immediately send an inquiry back to the user if the product is determined to be pirated or suspected of piracy. An inquiry may be to ask where/when the product was purchased, what the purchase price was and/or other information which can be used to identify the entity responsible for the piracy or distribution of pirated goods.

The process may also be such that the user sends a code to the known number to receive information if the product is authentic or a pirate product. Thereafter, the manufacturer requests a further code or alike information from the user. When using two pieces of information (and possibly another sender identity than whereto the user sent the first message) to authenticate the product, the level of security is increased.

In some of the embodiments described earlier, a so-called Dynamic Dialog Matrix (DDM) can be used, in which the processing logic or intelligence of the service dialog is implemented in the service system, in such a way that the mediator and/or service provider systematically varies the reply address (typically a network address, such as a telephone or subscriber number, e-mail address, web or IP address) according to the stage of the dialogue, so that, even in a discontinuous dialogue of long duration, the service provider knows both which client has responded to a question in the dialogue and at which stage in the dialogue.

Some challenges still remain as far as service provisioning is concerned. Embodiments described in the following aim at providing solutions to such challenges. These embodiments are intended to create an entirely new type of method and system for the sending, particularly the bulk delivery of messages, as well as to preferably provide a service for international use.

The invention is also intended to provide methods and means, with the aid of which it is possible to achieve a simple and clear way of providing services in multi-channel communications.

In addition, the invention is intended to create methods and means, by means of which a query and service can be sent to a customer through different communications networks.

In a specific embodiment of the invention, messages, such as text messages are used in a dialogue, in which content services are delivered to the customer. The services are provided typically using the service provider's means of payment, such a bonus points. If the customer and service provider have a mutual agreement concerning other means of payment, these can also be used to bill the customer.

Session management and/or authentication (secure verification) can be improved by features in which typically the sender data of each message sent, typically by bulk delivery, is changed to correspond to a predefined dialogue, in which the stage of the dialogue determines unequivocally the sender data, in which case the sending and reception of the messages are implemented in different parts of the telecommunications network and the user is permitted to respond in only one way, so that the service is delivered in response to the billing of the means of payment used by the service provider.

One specific embodiment of the invention is based on the reception, at the sender address defined in the in the previous stage of the dialogue, or an address contained in the message, in the message dialogue, of a message from the user over a second telecommunications channel (data connection, VOIP connection, WAP connection, or internet connection) and on proceeding according to the contents of the message. If necessary, the next text-format message of the session is sent to the user of the message service, in such a way that the sender address (e.g., the A number) is changed to correspond to the session number and a new session stage.

According to one specific embodiment of the invention, the interval in time between the first offer message and the following message depends of the content, size, or temporal duration of the repetition of the service delivered.

In one specific embodiment of the invention, the service is delivered using a communications channel differing from the telephone connection.

In one specific embodiment of the invention, the service is delivered to some other terminal device of the user.

The solution is operator-independent and will operate in the networks of all operators. The most typical applications of the invention will operate in any GSM customer telephone whatever, in any network whatever. The invention offers a cost advantage thanks to the bulk delivery while reception, however, operates entirely country-independently, i.e. completely in a roaming mode from the network of each operator. In addition, the system permits the service provider to provide paid services to existing customers, without risk.

The adjustment of the interval between messages permits both optimization of the technical capacity of the telecommunications network and the optimization of the delivery and acceptance of the messages. The service can be delivered flexibly to many different terminal devices.

Figure 8:
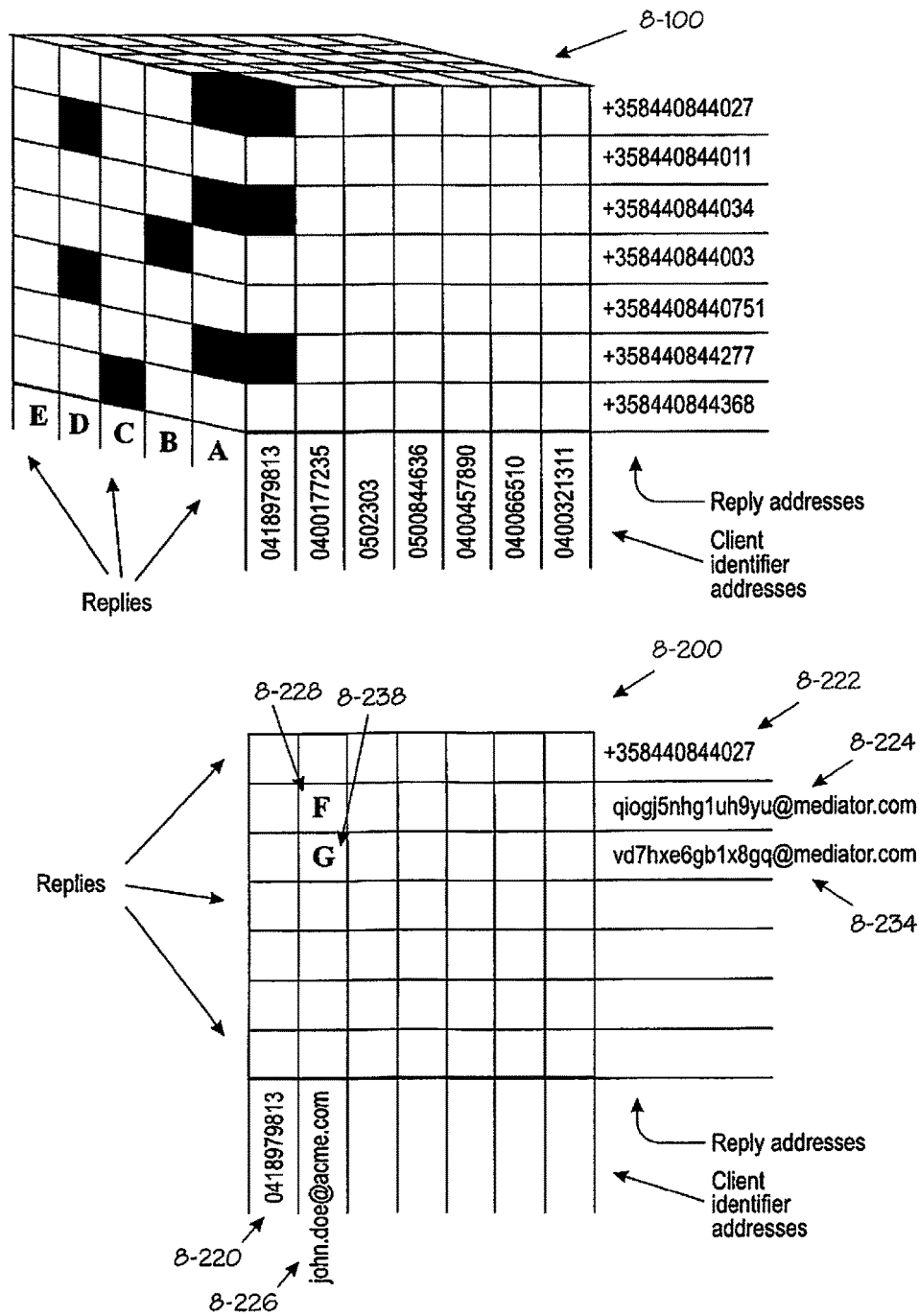
FIG. 8 shows illustrative examples of a dynamic dialog matrix.

FIG. 8 shows illustrative examples of a dynamic dialog matrix. Reference number 8-100 shows a use case in which the DDM matrix is illustrated as a three-dimensional matrix with client identifier addresses plotted along the X-axis, the reply addresses are plotted on the Y-axis and the replies are plotted on the Z-axis. An exemplary client with phone number 0418 979 813 is the left-most user along the X-axis. The answers are plotted along the Z-axis corresponding to the reply numbers on the Y-axis. The three-dimensional visualization of the DDM matrix can be interpreted such that for the client with the phone number 0418 979 813 and reply address +358440844027 the truth value for reply "A" is true, while for the other replies the truth value is false.

Reference number 8-200 shows a use case in which the DDM matrix is illustrated as a two-dimensional matrix with client identifier addresses plotted along the X-axis, the reply addresses are plotted on the Y-axis and the replies are stored in the intersections of the client identifier addresses and the reply addresses. The use case 8-200 is one wherein communication between the mediator and client begins in one communication format (or protocol) and communication is continued in another communication format (or protocol). In the presently-described use case, the mediator sends a first inquiry message to the client terminal whose client identifier address is 0418 979 813, as denoted by reference number 8-220. The mediator sends the first inquiry message by using a sender number of +358440844027, as denoted by reference number 8-222. The first inquiry message contains service continuation information by which the client terminal is able to continue service provisioning in a second communication format, which in the present example is e-mail. To facilitate service continuation by e-mail, the mediator sends an e-mail address "qiogj5nhg1uh9yu@mediator.com", in the first inquiry message. The e-mail address, denoted by reference number 8-224, is preferably formatted as a link. When the client uses the terminal's user interface to navigate to the link, activation of the link launches the terminal's e-mail application. In the present example, the client opts to continue service provisioning by e-mail and activates that link, thereby causing activation of the e-mail application. The e-mail application sends the client reply by using the client's e-mail address, herein "john.doe@acme.com", as denoted by reference number 8-226. Reference number 8-228 denotes the client's reply. Naturally, the length and contents of the reply may be arbitrary, and the single letter F is a mere placeholder for the actual reply.

In the present example, the e-mail address 8-224 "qiogj5nhg1uh9yu@mediator.com" is difficult if not impossible to determine on the basis of prior communications. Providing that the e-mail address 8-224 has not been sent to anyone else, the client terminal having the client identifier address 8-222 and the e-mail address 8-226 is, with close to absolute certainty, the client terminal from which the reply 8-228 was sent.

In the present example, the mediator sends a second inquiry message to the client's e-mail address 8-226. For the second inquiry message the mediator uses another hard-to-guess e-mail address denoted by reference number 8-234.

The client uses their e-mail address 8-226 to send the reply denoted by reference number 8-238 and the symbol "G".

For the sake of clarity, the second use case 8-200 only shows communications with one client. A real-life example naturally involves multiple clients and client terminals, whereby the mediator should associate two addresses of the client terminal, namely the telephone number 8-220 and the e-mail address 8-226.

While the present use case relates to a scenario in which the dialog between the mediator and client terminal begins by using short messaging and continues by using e-mail, the procedure is largely analogous for other combinations of two or more communications formats or protocols. Some minor differences between the various communications formats may be encountered, however. For instance, mnemonic network addresses, such as the client's e-mail address, are usually static, which is why the mediator may associate the client's e-mail address with the telephone number and use the client's detected e-mail address 8-226 in subsequent sessions even if these take place a long time after the session in which the e-mail address 8-226 was detected. Numerical IP addresses, on the other hand, are often allocated dynamically, which is why the mediator cannot rely on a numerical address when it needs to reach the client in a subsequent session. Instead the client should be contacted by using a more static address, such as telephone number or e-mail address.

Figure 9A:
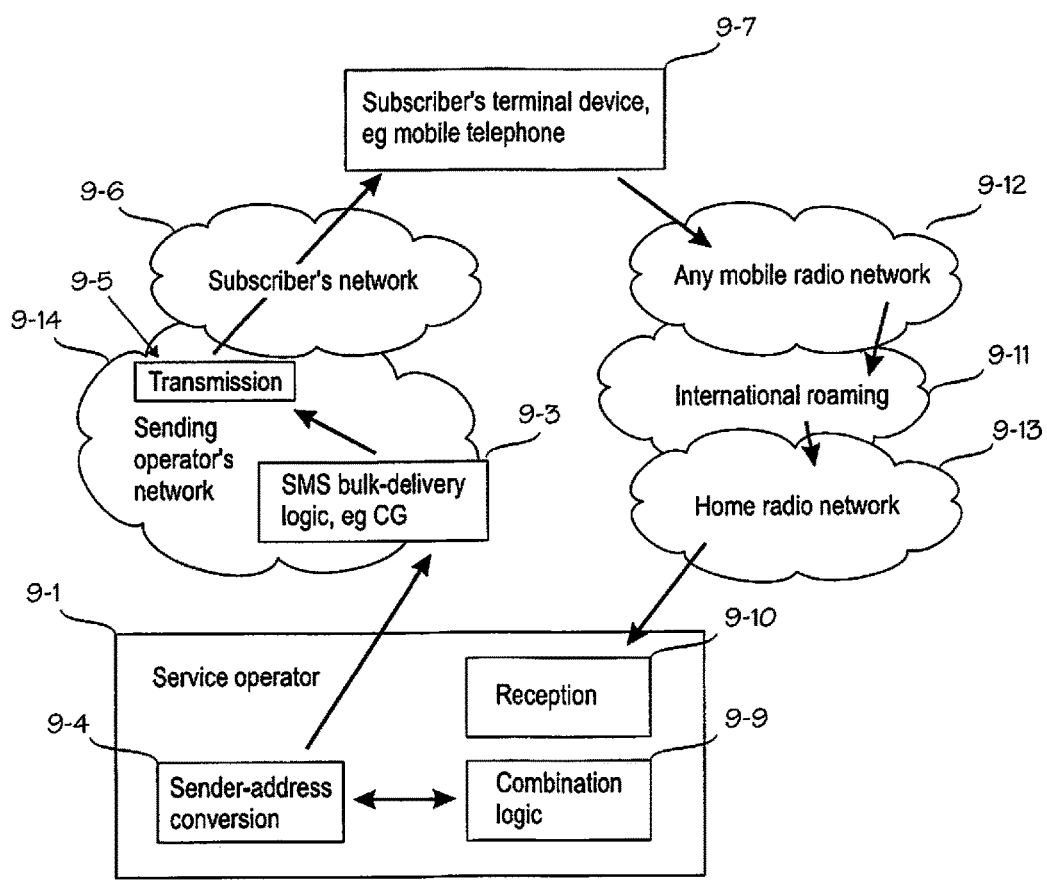
FIG. 9A schematically shows a signalling diagram illustrating a use case of an embodiment of the invention in the case of international roaming.
Figure 10:
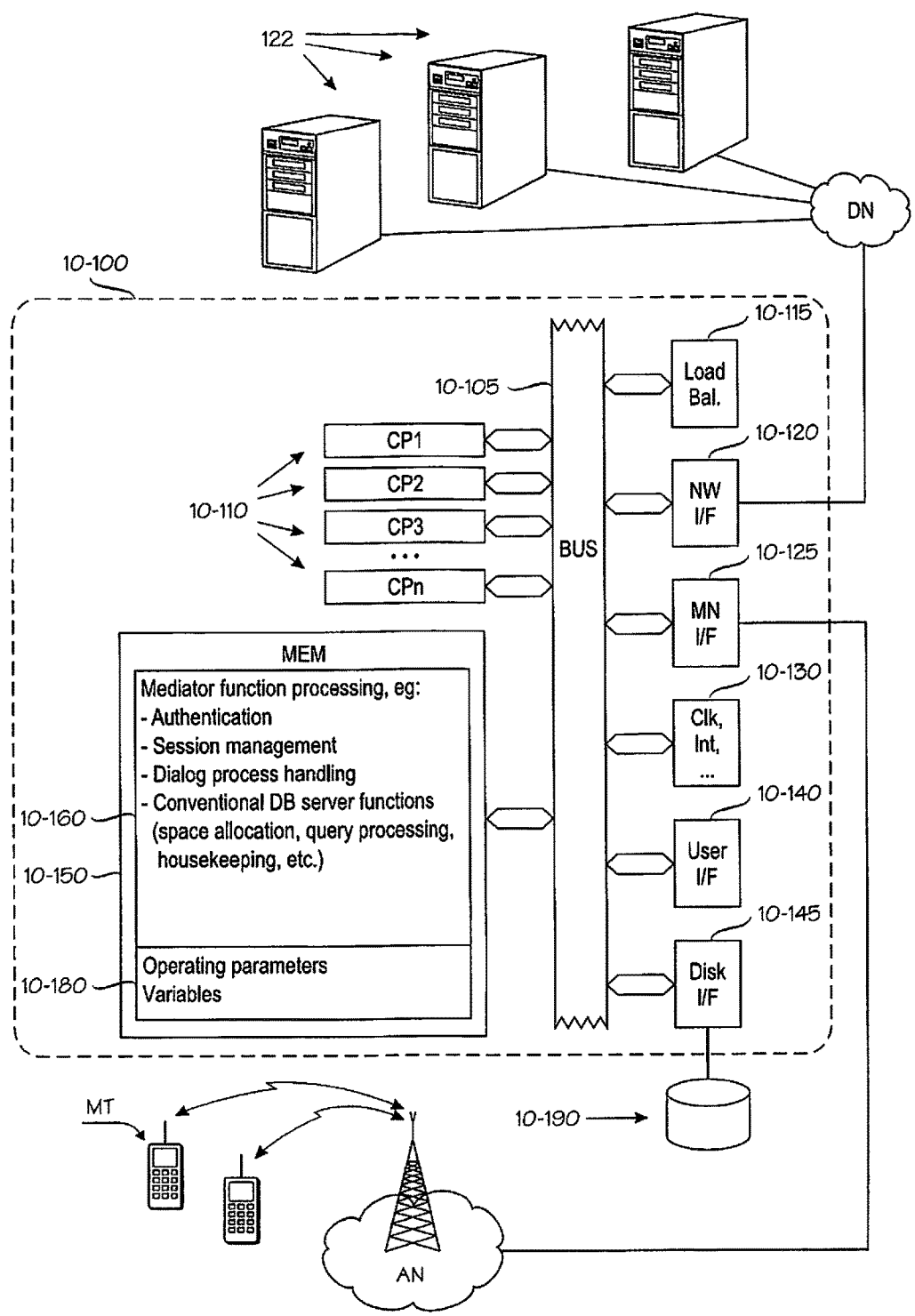
FIG. 10 schematically shows an exemplary block diagram for the various information processing and/or mediating servers in the systems described earlier.

FIG. 9A shows yet another use case. In the system shown in FIG. 9A, there are typically two parties, which, in exceptional cases, can be the same company. The service company or association 9-1 provides a service, which provides subscribers with, for example, a registration service for buying tickets, changing tyres, etc. The service company or association 9-1 operates in a radio network, the home network 9-13 of some operator.

In the present application, the term service company or association 9-1 refers to an association or company, which operates in either its own or an extraneous network, producing services for customers either directly or indirectly. Typically, such a company or association is a sub-contractor of an actual telephone operator, nor does a user of the service necessarily even know of the existence of the service company or association 9-1. In some use cases, the service company or association produces either directly or indirectly many kinds of registration and booking services for telephone subscribers.

The system also includes a telephone operator, in whose network 9-14 there are means and equipment for the bulk delivery of digital messages (such as SMS messages) containing sender data. Such a practical network element is, for example, SMS bulk-delivery logic 3, which can be implemented using, for example, Content Gateway technology.

Figure 9B:
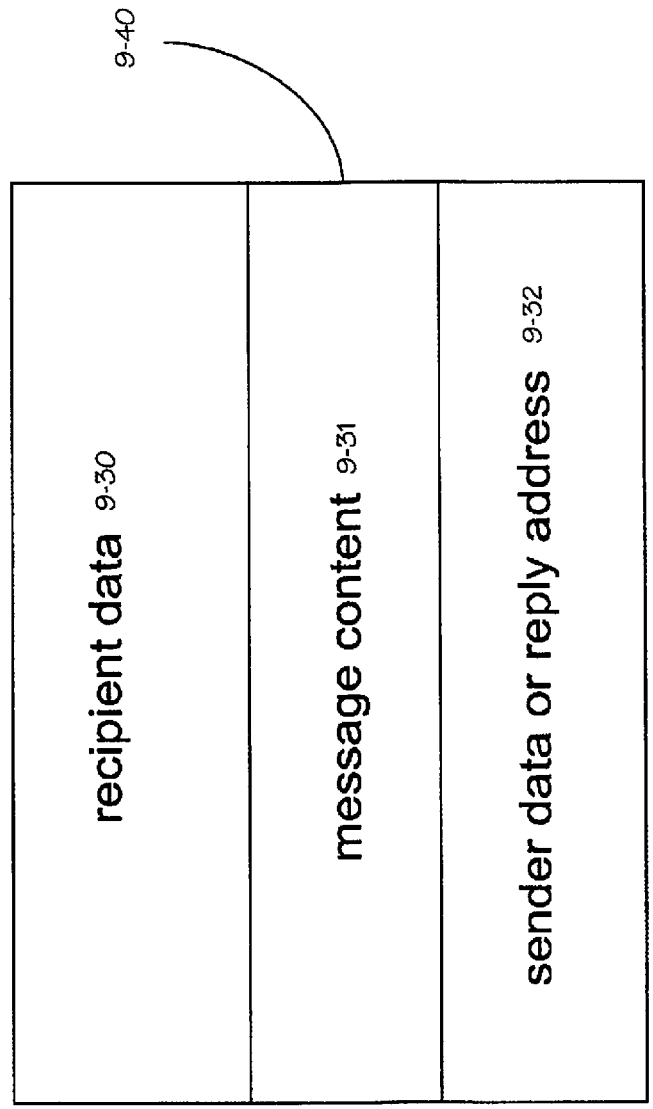
FIG. 9B schematically shows data fields in a message according to an embodiment of the invention.

With reference to FIGS. 9A and 9B, in the first stage the service company or association 9-1 uses connection logic 9-9 and number adaptation 9-4 to form a number of messages 9-40, each of which contains recipient data 9-30, the actual message content 9-31, and information 9-32 on either the send or, in practice, the address to which a reply to the message 9-40 is desired. In an SMS (short message system) application, the recipient data 9-30 is the telephone number of a mobile station while the sender data 9-32 is the sender data in the sender field of the SMS-message sender field 9-32 converted by a number converter 9-4.

Within the scope of the invention, the message 9-40 can be any message whatever that can be sent through a digital data network, and which comprises recipient data, the actual message, and the desired reply address, for example, in the form of sender data. Such messages 9-40 can be not only SMS messages, but also, for instance, email messages or multimedia messages (MMS).

A large number of the aforementioned messages are formed dynamically on the basis of complex dialogues.

When altering the desired reply address, for example, the sender=s number, the address (or number) from which the contact to the service company or association 9-1 has been made can be taken into account. Thus, the messages of subscriber=s in the USA can be routed to their own national server while correspondingly the messages of Finnish users of the same service are routed to their own national server. From these national servers, the reply messages can be transferred over suitable telecommunications links for further measures by the service company or association 9-1.

The messages created by the service company or association 9-1 are sent to the bulk-delivery logic 9-3, which is located in the operator's network 9-14, from which the bulk delivery 9-5 of the messages is implemented. From there, the messages 9-40 disperse always according to the recipient data 9-30 and arrive at the subscriber's terminal device 9-7 through the radio network 9-6 at the time. The subscriber replies to the message using the reply function, when the reply message is sent to the address that determines the value of the sender or reply-address field 9-32 of the incoming message. The message 9-40 proceeds to the service company or association 9-1 over the radio networks 9-12, 9-11, and 9-13. Naturally, if the subscriber is in the area of the home network 9-13 of the service company or association 9-1, the message will not travel over the networks 9-11 and 9-12. From the home network 9-13, the message is transferred to the message reception of the service company or association, where it is combined with a suitable dialogue with the aid of combination logic 9-9 and number conversion.

More concretely, for example in an SMS application, when a message is sent to the subscriber's terminal device 9-7, the sender number (A number) is altered before bulk delivery in block 9-4, for example to +35850001, in the first stage of a predefined session (dialogue). The number space of the sender number (A number) is defined by the service provider's own number space, which in the invention is entirely independent of the operator's number space. In the next stage of the same session, the A number is guided by the logic 9-9 of the service company or association 9-1 to be, for example +35850002, and so on. The sending A number is defined strictly from a logically progressing dialogue created by the service provider 9-1, in which the reply to each message sent is expected at a specific telephone number (digital reply address), which is included in the outgoing message as the A number.

Thus, the subscriber replies to the SMS message using the reply function, in which case in the first stage of the dialogue the reply goes to the number +35850001 and correspondingly in the second stage of the dialogue to the number +35850002.

Example of a dialogue:

| Message | Sender number |
| --- | --- |
| 1. Do you want to download a piece of music? Reply y/n | +35850001 |
| 2. Do you want to download the video of the piece you heard? Reply y/n | +35850002 |

The subscriber's reply "y" sends the message to the service provider's system 9-1. The dialogue terminates if the reply to the first message is "n". Thus the messages described above can be sent to several recipients at one time, in which case the A number (=field 9-32) of the first stage of the dialogue would always be +35850001 and correspondingly in the second stage of the dialogue always +35850001, so that the reply to each message sent will always be assigned to the correct number. In connection with the reply, the sender's A number defines to whom the booking will be made.

In some implementations, the query and reply messages may be SMS messages, but in other implementations the message can also be some other form of digital messages, in which the message can be replied to, without the subscriber having to explicitly define the recipient. Thus, instead of telephone-number data, the sender or reply address field (field 9-32 in FIG. 9B) of the message can contain the desired reply address in some other form, for example, as an e-mail address, or as numerical or alphanumerical sender or reply address data.

For example, the message 9-40 shown in FIG. 9B can contain the following fields:
Field 9-30: recipient data (eg mobile telephone number);
Field 9-31: message content (eg "do you want to request this service?", or "do you authorize this payment)";
Field 9-32: this field contains one or more addresses which the mediator has associated with the message 9-40 and in which addresses the mediator is prepared to receive the reply message. In one illustrative implementation, the field 9-32 contains one or more network addresses, such as an e-mail address, a mnemonic web address and/or a numerical Internet Protocol (IP) address.

For session management (keeping track of which reply message belongs to which inquiry message) with honest clients, it is normally sufficient for the mediator to assign a different reply address for each inquiry message that the client has not responded to. That way the fields 9-30 and 9-32 contain a unique combination of sender and recipient addresses for the series of inquiry messages that the client has not (yet) responded to. Accordingly it is possible to determine unambiguously which inquiry message the client is replying to.

Fraudulent users may learn from the system and identify possible patterns, if any, in the reply addresses 9-32. In case a client's credit card and mobile telephone are stolen, or the credit card number and security code, plus the last-used reply address (field 9-32) is otherwise known by a fraudulent person, they may attempt to make payments with the credit card information and confirm such payments by making educated guesses as to which reply address (field 9-32) the mediator might use next. Accordingly, it is beneficial to implement a feature whereby the subsequent reply addresses are not derivable from prior-used reply addresses. For instance, the reply addresses can be selected according to a pseudo-random algorithm from a sufficiently large pool of addresses.

In a case wherein the reply addresses are telephone numbers, the network operators may allocate a sufficiently large pool of addresses for use by the mediator. In the case wherein the reply addresses are e-mail addresses, the mediator may operate with one e-mail domain, under which multiple recipient addresses are generated randomly. For instance: qiogj5nhg1uh9yu @ mediator.com; mhg5x9jm4 @ mediator.com and so on. Yet further, in cases wherein the reply addresses are web addresses, one (or more) web address(es) of the mediator, concatenated with a randomly generated extension, can be used as the reply address. For instance: mediator @ operator.com/9kn6hdf8b3; mediator @ operator.com/jf4 n9mhb58v, and so on. In the last example, assume that the reply address mediator @ operator.com/9kn6hdf8b3 is sent to the client terminal in the form of a link. That link is naturally contained in the inquiry message. When the client responds to the inquiry message, they navigate to the link and activate it. Activation of the link causes the client terminal's web browser to navigate to the web page mediator @ operator.com and offer the randomly-generated extension "9kn6hdf8b3" as a parameter by which the mediator's web-communication processing can determine which inquiry message that parameter was sent in, and accordingly, which client terminal is being used to send the reply message.

Those skilled in the art will realize that SMS messages and e-mails may send the entire reply message in a single message (SMS or e-mail message, respectively), while navigation to a web page requires a set of back-and-forth signals, one of which establishes connection with the web server and as subsequent one delivers the contents of the client's reply. For the purposes of the present invention, such a set of signals constitutes one reply message.

Thanks to the number conversion, the reception of the message takes place typically in an open radio network (or alternatively e.g., in a wireless local network, such as a WLAN or similar) external to the network of the operator 2 sending the message and is routed on the basis of the A number to the system of the service company or association 9-1.

Thus, in the invention in the SMS application, prior to bulk delivery the data in the 'sender' field of the text message being sent is altered, in such a way that the value entered in it is different to the sender's real number. This value is obtained from the logic 9-9, 9-10 of the service company or association 9-1, according to a predefined rule, in such a way that the questions and replies arriving at the logic can be linked.

In addition, in the system of the service company or association 9-1, there is logic 9-9 connecting the sending end and the receiving end, which can link a sent message and its incoming return reply from the external operator, in such a way that a subscriber can reply (from outside the network) from any subscription at all, but, however, sending can be done from inside the network at a high capacity and economically. In other words, the cheapest sending operator can be selected, but reception can be from any data network whatever.

According to the present embodiment, at the message-receiving end it is possible to distribute the reception in such a way that, for example, in Sweden reception takes place at a local network element and correspondingly in Finland at a Finnish network element, from which national network elements the messages received are transferred over suitable links, for example IP links, to the system of the service company or association for further processing. The international roaming of the service will then be faster and cheaper, as well as more reliable. In addition, it is more pleasant for a consumer to use the service, because sending takes place to the number of a local operator and not to the network of a foreign operator, which is perceived to be expensive. In some subscriptions, foreign text messages may even be blocked, i.e. they will not operate without the service according to the invention.

According to FIG. 9A, an embodiment according to the invention may be implemented as follows. A logically continuous, but temporally discontinuous session N of long duration is implemented as follows. The session N is divided into sub-stages J (9-43, 9-41, 9-42), which are typically temporally separated from each other. The session N itself is, however, logically continuous, in other words the queries and replies proceed logically over the entire session.

The service relating to the session N is initiated in block 9-43. The first text-form message of the session N is then sent to a service user, in such a way that the sender address (e.g., the A number) is altered to correspond to the session number N and the session stage J.

Block 42 depicts the stages 2 through n of the session N, in which a text-form message to the sender address defined in the message in the previous stage is received from the user of the message service, and which proceeds according to the contents of the message, in such a way that the sender address (e.g., A number) is altered to correspond to the session number N and the new session stage J. Next, the next text-form message of session N is sent to the user of the message service.

According to block 9-42, an additional stage according to the invention is implemented at some stage of the process, in which the service provider offers a service subject to payment and, in reply to this offer message, acceptance of the delivery of the service subject to payment is received from the user of the message service.

According to FIG. 9D, a method and system according to embodiments of the invention can be applied in an environment, in which there is a service provider 9-52, for example an airline. In addition to this, there are several users, of which the figure shows one user, who has two terminal devices, a mobile telephone 9-50 and a laptop or palm computer 9-51. In addition, the figure shows an additional service producer 9-53 and the public internet network 60. Instead of the internet network, it is also possible to use, for instance, a WLAN network, or a corresponding telecommunications network.

The method according to the invention proceeds in such a way that the service provider typically approaches the mobile stations 9-50 of several users and sends an offer 9-54 of a service, for which payment will be made using the service provider's own means of payment, such a bonus points (or frequent-flyer miles). The user is given the chance to reply and the delivery process of the service typically initiates only if an unequivocal acceptance message is received from the user 9-50, for example, "y", "Yes" or some other corresponding short message, for example in the form of a text message.

Once the process has been initiated by the unequivocal message, the service is sent, either directly as a download 9-56 to the mobile telephone, or alternatively the message 9-56 can be a text-message link to some other telecommunications system, such as the link address of the service provider 9-53, from which the actual service such as music or an image is downloaded by means of a return message 58. The connection from the mobile station 9-50 to the system 9-53 can be based on WAP, WLAN, or some other suitable technology.

Because the service provider has typically comprehensive information on the data of its customer, such as the service profile and the available technology, the service can be delivered 9-59 directly to the second device 9-51 of the user, or in parallel to both the telephone 9-50 and the computer 9-51 of the user.

In the solution of FIG. 9D, the first offer message 9-54 is followed by a second service offer message 9-62, which is preferably sent after a delay relative to the first message 9-54 that corresponds to the combined time of the delivery and use of the first service to be delivered. Typically, this transmission delay can be the duration of the delivered music or video performance, added to the time taken to send the service. In streaming services, in which the service is delivered as a bit stream after the acceptance of the service, the delay is correspondingly the time between the acceptance and the termination of the bit steam. In the present application, the term streaming refers to a term generally used in the field, in which previously ordered material is delivered to the user or customer as an essentially continuous data stream suitable for use immediately. The definition thus differs from a file download service, in which the user or customer of a data network downloads a file and uses the service contained in the downloaded file with the aid of their own software, when the need for use arises, without the transfer services of a data network.

Generally, it can be said that in the present embodiment, flexibility is improved by using multiple communications technologies, for instance by combining text messages with other forms of data communications, thus exploiting suitable communications channels in multi-channel operation. In the example of FIG. 9D, data links are typically used in the messages 9-57, 9-58, 9-59, and 9-61, whereas the message 9-54, 9-55, 9-56, and 9-62 are typically text messages.

Particularly when network and terminal-device technology develops, it will naturally be possible to implement solutions, which may deviate from the general principles described above.

In terms of practical implementation, a problem is the estimation of the real amount of the delay, because both the telecommunications network and the service user too can be loaded and the time greater than the optimal time permitted by the telecommunications network.

Thus, according to one embodiment of the invention, the transmission delay between the first offer message 9-54 and the second offer message 9-62 is defined on the basis of the contents or type of the service.

In some implementations the transmission delay is typically defined as the sum of the typical reproduction time and the typical transfer time. In other implementations the transmission delay is defined as a function of the file size or file type.

In the following is an example of one dialogue:

| Message | Sender number |
|---|---|
| 1. Do you want to use your bonus points to download music at a price of 500p/piece? y/n | +35850001 |
| 2. Reply 'y' to number | +35850001 |
| 3. Delivery of service | |
| 4. New message at a delay proportional to the content to the same customer number 'Do you want to download a new piece or video?' | +35850005 |
| 5. Reply 'y' to number | +35850005 |

A service can be implemented as a group message at an airport, such as a group message to subscribers flying on one aircraft and, after this, the service dialogue can be tailored in the aircraft in the area of coverage of the aircraft's base station, on the basis of the replies and choices of the individual users.

A single user can naturally have more than two terminal devices. In examples, wherein the service relates to delivery of content or media, the services can be music, image, or video content, or search services, dictionary services, to name just a representative sample of use cases. Providing a service against payment can also comprise the user agreeing to receive advertising material in lieu of payment for the service.

In the present context, the term sender data refers both to a telephone number (A number) and to any information whatever of the desired return address transported with the message.

The sender address can also be an e-mail address, a web address (mnemonic) or an IP address (numerical). Several of the embodiments described in the following are associated with the query and reply addresses (numbers/IP addresses, etc.) being able to be combined with a specific question. The timing of the transmission of a new question can be made in several different ways. Alternative ways include timing relative to the time taken to transfer the file and the time taken to download, in which case the timing delay can be directly the sum of these times or proportional to them. It is also possible to use a transmission delay, which is the sum of the transfer time and the reproduction time added to a constant amount of additional time. The additional time will be necessary, if, for example, the transfer speed of the data network is not stable. Alternatively, the timing delay can always be of a constant magnitude according to the message type. The queries can be also be sent nearly simultaneously, or alternatively a sign (bit, flag, etc.) can be attached to the file being sent, and the sign can be sent back to the service provider once the download/listening/viewing has taken place. The last-mentioned alternative may require an applet or other kind of a short program to be installed in the terminal device, so that the notification in question can be send to the service provider. Such embodiments are described with reference to FIG. 9D.

In one embodiment of the invention, the offer message 9-54 is sent (as a text message) from the service provider to the customer ("do you want a certain piece or video"). Transmission can take place, for example, over a GSM network. The customer replies yes or no, as indicated by reference numeral 9-55.

The piece or video is sent as messages 9-56, 9-58, 9-61 to the terminal device 9-50, 9-51 (cell phone or otherwise defined terminal device, e.g., laptop computer) of the customer. The piece or video is delivered, e.g., over a data connection.

After a specific time, a second message 9-56 is sent to the customer (with a different reply address to the first message), in which the customer is asked if they want a new piece or video (piece or video offered can be selected, e.g., on the based of previous selections by the user, on the basis of the user's profile, etc.).

The customer replies y/n.

If the customer replies y, the aforementioned series of stages can start from the beginning in the case of a new piece or other service.

According to another embodiment of the invention, an offer message is sent (as a text message) 9-54 from the service provider 9-52 to the customer (do you want a specific piece or video). The service can be implemented, for example, through a GSM network.

The customer replies y/n. The customer is sent a text message 9-56, in which an individuated IP address 9-57 is given, from where they can fetch the piece or video. After a specific time, a new query message 9-62 is sent with a different reply number. The aforementioned process is repeated concerning the delivery of new queries and products.

According to another embodiment of the invention, a query message 9-54 is sent, for example over a local network in an aircraft, to customers who are within the coverage of the network (the message can be sent either to a cell phone or a computer, etc.).

The customer replies yes or no, as indicated by reference numeral 9-55. A file is sent to the customer as messages 9-56, 9-58, 9-61. A new query 9-62 is sent to the customer. In this query, there is a different reply address to that in the previous sent message. The process is continued in the manner described above in the case of the second service (piece of music, or similar).

In all of the above cases, the timing of the transmission of the next message can be predefined. For example, a new message 9-62 is sent at two-hourly intervals, or the message is sent immediately after the reception of the previous reply. The situation can also be such that, after the reception of the first reply, new messages are sent to the customer at short intervals. In that case, in all of these messages there should be different reply addresses, so that it is possible to identify the question to which the customer is replying. In addition, the cases described above can also be performed by using communication formats or protocols other than messaging.

If the piece of music or video is delivered directly to the customer's telephone, the service provider must know whether the customer's telephone supports transmission and performance formats of the kind used. This can be determined from the service provider's customer profile, provided these data are maintained sufficiently actively. The service provider's customer profile can also contain information on whether the customer has in use several different types of terminal device, such as palm computers, laptop computers, or smart telephones.

If the aforementioned services are offered in a single aircraft or otherwise restricted area, this system should also include a possibility for several numbers/addresses to be used as reply addresses. In that case, it is possible, for example, to implement a number pool in the aircraft's server, which will then act as the service supplier.

In another embodiment of the invention, if the service provider is, for example, an airline, which has its 'own' subscription and sufficiently comprehensive information on the customer and connections to, for example, travel agents and/or hotels and/or taxi firms, etc., the following kind of embodiment can also be taken into account.

A customer books a flight from Helsinki to Berlin. If the customer checks in using their cell phone, the service provider can send them various kinds of messages. The messages can contain, for example, ordering a taxi to be ready at the airport when the flight lands in Berlin, booking a hotel, and many other possible functions. When the customer lands in Berlin, switches on their cell phone and the cell phone registers on a network, offers can be made to them concerning, for instance, music, videos, ordering a taxi, hotel booking, etc.

At a principle level, the process then proceeds as follows: The customer receives one or more service offering messages from the service provider of the airline (either the airline itself or a service provider acting as its agent). By replying to the service offering messages the customer can check in using their own cell phone. The service provider then knows the destination and time of travel of the customer.

When the customer lands at their destination and switches on their cell phone (when connection to a network takes place), the service provider sends a text message 9-54, in which it offers services to the customer (taxi, piece of music, video, hotel, map service, etc.). The customer replies whether they wish to receive the service. If the customer replies yes, the service is delivered to the customer. The service provider sends the following query 9-52 from a reply number that is different from the reply number used in the first query, so that the system can identify the question to which the reply is made, which customer has replied, and what that customer's reply was.

The invention is not restricted to the embodiments described above. Thus, for example, the messages can be also a multimedia message (MMS) instead of an SMS message. The message type can vary within the invention, in other words it can start as a multimedia message and use at least one text message as a further message, or vice versa.

The introductory portion of this application contained a reference to commonly owned U.S. patent application Ser. Nos. 13/452,229, 13/452,311, 13/529,776, and 13/529,737, filed 21 Jun. 2012, all titled "Managing Recurring Payments from Mobile Terminals", and all claim priority from multiple applications, including FI 20011680, filed Aug. 21, 2001. The entire disclosure of these commonly owned US patent applications is incorporated herein by reference. These applications disclose techniques in which one or more payment processor computers, one or more service provider computers and one or more mediator servers coordinate to provide servers to user that is a holder of one or more payment cards. Some use cases relate to the payment processor computer, other use cases relate to the mediator server, while yet further use cases relate to the server provider computers. It should be noted that while the user is a holder of one or more payment cards, effecting payment does not always require use or even possession of a physical card and mere information suffices in some cases, such as in online shopping. While this is convenient for honest uses, it opens possibilities for fraud. Further flexibility for fraud prevention and/or session management can be provided by utilizing the above-disclosed techniques wherein at least one service continuation message is sent to the client terminal devices, the service continuation message(s) comprising service continuation information by which the client terminal is able to continue service provisioning in a second communication format which is different from the first communication format.

For instance, one specific embodiment can be implemented as a method for a payment processor computer configured to manage transactions related to one or more services provided by service providers that comprise a first service provider and a second service provider, the transactions being payable by one or more payment cards. The method comprises performing the following acts at the payment processor:

processing a first request to authorize first recurring payments to the first service provider, the recurring payments payable by a first payment card of the one or more payment cards;

receiving a second request to authorize second recurring payments to the second service provider, the second recurring payments payable by a second payment card of the one or more payment cards, and wherein the first and second payment cards may be the same payment card or separate payment cards;

in response to the second request, using a first mediator server to obtain confirmation from the holder of the payment cards that the second service provider may propose services to the holder of the payment cards;

creating a token that identifies the second service provider, wherein the token fails to globally identify the second payment card but identifies the second payment card within payment cards issued to a holder of the payment cards;

sending the created token to a second mediator server;

receiving from the first or second mediator server an acceptance notification indicating that the holder of the specific payment card has used a mobile terminal via a mobile network to authorize the second recurring payments to the second service provider, wherein the first mediator server and the second mediator server may be the same mediator server or different mediator servers.

In another aspect, the use cases relating to fraud prevention can be implemented as a payment processor computer configured to perform the acts specified above. For instance, the payment processor computer may be implemented as a server computer configured to communicate with the mediator server over a telecommunication network. The payment processor computer comprises a memory and one or more processing units. The memory stores program instructions whose execution in the one or more processing units causes execution of the acts specified in connection with the method. For high-volume implementations, the payment processor computer may comprise multiple processing units and load-balancing unit for distributing processing load among the multiple processing units.

In some implementations the payment processor computer complies with specifications issued by Payment Card Industry ("PCI") Security Standards Council, while the mediator server operates outside said specifications. This implementation facilitates introduction of new services because transactions relating to the new services can be managed by the mediator server which does not have to comply with the PCI specifications.

For instance, the payment processor computer and mediator server may provide joint authentication of the holder of the payment cards. In one implementation, the holder of the payment cards is authenticated by the payment processor computer using a first terminal and a first set of authentication information. The holder of the payment cards indicates a second terminal also operated by the holder of the payment cards, and the user of the second terminal is authenticated by using the second terminal and a second set of authentication information. The first request is received from a first terminal and indicates a second terminal, wherein the first terminal and second terminal may share a common physical device or reside in separate physical devices but the first terminal and second terminal use different authentication information. In an illustrative but nonlimiting example, the first terminal is authenticated by using one or more of: a combination of user identifier and password; a programmed microchip and a PIN code, while the second terminal may be authenticated by using a non-predictable reply address for sending a notification to the second terminal. If the user of the second terminal has been able to respond to the notification, this means that the second terminal has received the notification from the mediator server. Otherwise the second terminal or its user could not know the non-predictable reply address. In view of the fact that the notification is sent to the second terminal which is identified in the first request from the first terminal, any fraudulent action is only possible if both the authentication information used from the first terminal and the second terminal are stolen before the theft is detected and the payment cards are suspended.

Another specific implementation is a method for a mediator server configured to manage transactions, which relate to one or more services provided by one or more service providers and are payable by one or more payment cards. The method comprises performing the following acts at the mediator server:

receiving an acceptance notification indicating that a holder of a specific one of the one or more payment cards has operated a mobile terminal via a mobile network to authorize recurring payments to the first service provider;

sending a request to the mobile terminal operated by the holder of the specific payment card, the request requesting permission to authorize second recurring payments to the second service provider, the second recurring payments payable by a second payment card of the one or more payment cards, wherein an association exists between services of the first service provider and services of the second service provider, and wherein the first and second payment cards may be the same payment card or separate payment cards;

receiving confirmation from the mobile terminal operated by the holder of the payment cards that the second service provider may propose services to the holder of the payment cards;

relaying said confirmation to a payment processor computer;

receiving from the payment processor computer a token and storing the token, wherein the token identifies the second service provider, wherein the token fails to globally identify the second payment card but identifies the second payment card within payment cards issued to a holder of the payment cards.

In another aspect, the invention can be implemented as a mediator server configured to perform the acts specified above.

A still further embodiment can be implemented as a method comprising performing following acts at a service provider computer:

receiving information indicating that a holder of a specific payment card may authorize recurring payments for one or more services provided by a service provider in charge of the service provider computer;

sending, to a mediator server, a proposal for a service that incurs recurring payments payable by the specific payment card;

receiving from the mediator server an acceptance notification indicating that the holder of the specific payment card has used a mobile terminal via a mobile network to authorize recurring payments to the specific service provider.

In another aspect, the invention can be implemented as a service provider computer configured to perform the acts specified above.

Further aspects of the invention include a tangible computer program carrier embodying computer program instructions for instructing the various computers and servers to execute the above-identified acts.

FIG. 10 schematically shows an exemplary block diagram for the various information processing and/or mediating servers in the systems described earlier. For instance, such a server architecture, generally denoted by reference numeral 10-100, can be used to implement the mediators 100 and/or the servers for the service-specific systems 122, an example of which is the booking system 102. The two major functional blocks of the database server system SS are a server computer 10-100 and a storage system 10-190. The server computer 10-100 comprises one or more central processing units CP1 . . . CPn, generally denoted by reference numeral 10-110. Embodiments comprising multiple processing units 10-110 are preferably provided with a load balancing unit 10-115 that balances processing load among the multiple processing units 10-110. The multiple processing units 10-110 may be implemented as separate processor components or as physical processor cores or virtual processors within a single component case. The server computer 10-100 further comprises a network interface 10-120 for communicating with various data networks, which are generally denoted by reference sign DN. The data networks DN may include local-area networks, such as an Ethernet network, and/or wide-area networks, such as the internet. Assuming that the server computer 10-100 acts as a mediator 100, it may serve one or more service-specific systems 122 via the data networks DN. Reference numeral 10-125 denotes a mobile network interface, through which the server computer 10-100 may communicate with various access networks AN, which in turn serve the mobile terminals MT used by end users or clients. The network interface 10-120 may be reach to communicate with clients over data networks, such as the internet.

The server computer 10-100 of the present embodiment may also comprise a local user interface 10-140. Depending on implementation, the user interface 10-140 may comprise local input-output circuitry for a local user interface, such as a keyboard, mouse and display (not shown). Alternatively or additionally, management of the server computer 10-100 may be implemented remotely, by utilizing the network interface 10-120 and any internet-enabled terminal that provides a user interface. The nature of the user interface depends on which kind of computer is used to implement the server computer 10-100. If the server computer 10-100 is a dedicated computer, it may not need a local user interface, and the server computer 10-100 may be managed remotely, such as from a web browser over the internet, for example. Such remote management may be accomplished via the same network interface 10-120 that the server computer utilizes for traffic between itself and the client terminals.

The server computer 10-100 also comprises memory 10-150 for storing program instructions, operating parameters and variables. Reference numeral 10-160 denotes a program suite for the server computer 10-100.

The server computer 10-100 also comprises circuitry for various clocks, interrupts and the like, and these are generally depicted by reference numeral 10-130. The server computer 10-100 further comprises a storage interface 10-145 to the storage system 10-190. When the server computer 10-100 is switched off, the storage system 10-190 may store the software that implements the processing functions, and on power-up, the software is read into semiconductor memory 10-150. The storage system 10-190 also retains operating and variables over power-off periods. In large-volume implementations, that is, implementations wherein a single server computer 10-100 serves a large number of clients via respective mobile terminals MT, the storage system 10-190 may be used to store the dynamic dialog matrices associated with the clients and mobile terminals MT. The various elements 10-110 through 10-150 intercommunicate via a bus 10-105, which carries address signals, data signals and control signals, as is well known to those skilled in the art.

The inventive techniques may be implemented in the server computer 10-100 as follows. The program suite 10-160 comprises program code instructions for instructing the set of processors 10-110 to execute the functions of the inventive method, wherein the functions include performing the service provisioning and/or mediator features according to the invention and/or its embodiments.

Those skilled in the art will realize that the inventive principle may be modified in various ways without departing from the spirit and scope of the present invention.

The invention claimed is:

1. A method for facilitating provision of a service by at least one provider, the method comprising:
   utilizing a mediator server to control information communication between a plurality of client mobile devices and the at least one provider;
   associating each client mobile device of the plurality of client mobile devices with at least one client identifier address;
   sending a service provisioning message to a client mobile device of the plurality of client mobile devices, the service provisioning message including information including an address for facilitating provisioning of the service by the at least one provider to a client associated with the client mobile device;
   using the address to facilitate information communication with the client mobile device; and
   re-using the address for a same client mobile device in response to a lifetime of the service provisioning message having expired.

2. The method of claim 1, wherein the address is provided in a link formatted so as to be activated upon a user navigation act to the link.

3. The method of claim 1, wherein the address is selected from a plurality of addresses used by the mediator server to facilitate provision of the service by the at least one provider.

4. The method of claim 1, further comprising receiving information communication from the client via the Internet prior to sending the service provisioning message to the client mobile device.

5. The method of claim 1, wherein the address is an address for use by an application running on the client mobile device.

6. The method of claim 1, wherein the service provisioning message is a message compliant with Short Message System ["SMS"].

7. The method of claim 1, wherein the address is a network address and/or a reference to a network address.

8. The method of claim 7, wherein the network address and/or the reference to the network address is provided in a link formatted so as to be activated upon a user navigation act to the link.

9. The method of claim 7, wherein the network address comprises a Uniform Resource Locator ["URL"].

10. The method of claim 7, wherein the network address comprises an Internet Protocol ["IP"] address.

11. The method of claim 1, wherein using the address to facilitate information communication with the client mobile device includes provisioning the service in response to a user's client mobile device navigating to the address.

12. A method for facilitating provision of a service by at least one provider, the method comprising:
   utilizing a service providing computer configured to communicate with a plurality of clients via a mediator server, wherein each client is associated with a set of client identifier addresses and uses a set of client mobile devices to communicate with the mediator server, and the mediator server is configured to use a plurality of mediator server addresses for receiving communications from the set of client mobile devices regarding the at least one provider;
   associating each client mobile device of a set of client mobile devices with at least one client identifier address;
   sending a service provisioning message to a client mobile device of a set of client mobile devices, wherein the client mobile device is a mobile device, and wherein the service provisioning message includes information including an address for facilitating provisioning of the service by the at least one provider using the client mobile device;
   using the address to facilitate information communication with the set of client mobile devices including the client mobile device; and
   re-using the address for a same client mobile device in response to a lifetime of the service provisioning message having expired.

13. The method of claim 12, wherein the address is provided in a link formatted so as to be activated upon a user navigation act to the link.

14. The method of claim 12, wherein the address is selected from a plurality of addresses used by the mediator server to facilitate provision of the service by the at least one provider.

15. The method of claim 12, further comprising receiving information communication from the client via the Internet prior to sending the service provisioning message to the client mobile device.

16. The method of claim 12, wherein the address is an address for use by an application running on the client mobile device.

17. The method of claim 12, wherein the service provisioning message is a message compliant with Short Message System ["SMS"].

18. The method of claim 12, wherein the address is a network address and/or a reference to a network address.

19. The method of claim 18, wherein the network address and/or the reference to the network address is provided in a link formatted so as to be activated upon a user navigation act to the link.

20. The method of claim 18, wherein the network address comprises a Uniform Resource Locator ["URL"].

21. The method of claim 18, wherein the network address comprises an Internet Protocol ["IP"] address.

22. The method of claim 12, wherein using the address to facilitate information communication with the client mobile device includes provisioning the service in response to a user's client mobile device navigating to the address.

23. The method of claim 12, wherein, in response to the user's client mobile device navigating to the address, the service is provisioned on one of the set of client mobile devices.

24. The method of claim 12, wherein the service provisioning message sent to the client mobile device that is a mobile device is a message compliant with Short Message System ["SMS"].

25. A mediator server controlling communication between a plurality of clients and at least one provider, wherein the mediator performs the following acts for each of several pairs of client and provider:
   utilizing a service providing computer configured to communicate with a plurality of clients via a mediator server, wherein each client is associated with a set of client identifier addresses and uses a set of client mobile devices to communicate with the mediator server, and the mediator server is configured to use a plurality of mediator server addresses for receiving communications from the set of client mobile devices regarding the at least one provider;

associating each client mobile device of a set of client mobile devices with at least one client identifier address, sending a service provisioning message to a client mobile device of a set of client mobile devices, wherein the client mobile device is a mobile device, and wherein the service provisioning message includes information including an address for facilitating provisioning of the service by the at least one provider using the client mobile device;

using the address to facilitate information communication with the set of client mobile devices including the client mobile device; and re-using the selected address selected for a same client mobile device in response to a lifetime of the service provisioning message having expired.

26. The mediator server of claim 25, wherein the address is provided in a link formatted so as to be activated upon a user navigation act to the link.

27. The mediator server of claim 25, wherein the address is selected from a plurality of addresses used by the mediator server to facilitate provision of the service by the at least one provider.

28. The mediator server of claim 25, wherein information communication is received from the client via the Internet prior to sending the service provisioning message to the client mobile device.

29. The mediator server of claim 25, wherein the address is an address for use by an application running on the client mobile device.

30. The mediator server of claim 25, wherein the service provisioning message is a message compliant with Short Message System ["SMS"].

31. The mediator server of claim 25, wherein the address is a network address and/or a reference to a network address.

32. The mediator server of claim 31, wherein the network address and/or the reference to the network address is provided in a link formatted so as to be activated upon a user navigation act to the link.

33. The mediator server of claim 31, wherein the network address comprises a Uniform Resource Locator ["URL"].

34. The mediator server of claim 31, wherein the network address comprises an Internet Protocol ["IP"] address.

35. The mediator server of claim 25, wherein using the address to facilitate information communication with the client mobile device includes provisioning the service in response to a user's client mobile device navigating to the address.

36. The mediator server of claim 25, wherein, in response to the user's client mobile device navigating to the address, the service is provisioned on one of the set of client mobile devices.

37. The mediator server of claim 25, wherein the service provisioning message sent to the client mobile device that is a mobile device is a message compliant with Short Message System ["SMS"].

38. A service providing computer configured to communicate with a plurality of clients via a mediator server, wherein each client is associated with a set of client identifier addresses and uses a set of client mobile devices to communicate with the mediator server, and the mediator server is configured to use a plurality of mediator server addresses for receiving communications from the set of client mobile devices regarding at least one provider, wherein the service providing computer is configured to perform the following acts for each of several pairs of client and provider:

associating each client mobile device of a set of client mobile devices with at least one client identifier address, sending a service provisioning message to a client mobile device of a set of client mobile devices, wherein the client mobile device is a mobile device, and wherein the service provisioning message includes information including an address for facilitating provisioning of the service by the at least one provider using the client mobile device;

using the address to facilitate information communication with the set of client mobile devices including the client mobile device; and re-using the address for a same client mobile device in response to a lifetime of the service provisioning message having expired.

39. The service providing computer of claim 38, wherein the address is provided in a link formatted so as to be activated upon a user navigation act to the link.

40. The service providing computer of claim 38, wherein the address is selected from a plurality of addresses used by the mediator server to facilitate provision of the service by the at least one provider.

41. The service providing computer of claim 38, wherein information communication is received from the client via the Internet prior to sending the service provisioning message to the client mobile device.

42. The service providing computer of claim 38, wherein the address is an address for use by an application running on the client mobile device.

43. The service providing computer of claim 38, wherein the service provisioning message is a message compliant with Short Message System ["SMS"].

44. The service providing computer of claim 38, wherein the address is a network address and/or a reference to a network address.

45. The service providing computer of claim 44, wherein the network address and/or the reference to the network address is provided in a link formatted so as to be activated upon a user navigation act to the link.

46. The service providing computer of claim 44, wherein the network address comprises a Uniform Resource Locator ["URL"].

47. The service providing computer of claim 44, wherein the network address comprises an Internet Protocol ["IP"] address.

48. The service providing computer of claim 38, wherein using the address to facilitate information communication with the client mobile device includes provisioning the service in response to a user's client mobile device navigating to the address.

49. The service providing computer of claim 38, wherein, in response to the user's client mobile device navigating to the address, the service is provisioned on one of the set of client mobile devices.

50. The service providing computer of claim 38, wherein the service provisioning message sent to the client mobile device that is a mobile device is a message compliant with Short Message System ["SMS"].

* * * * *